(12) United States Patent
Mujumdar et al.

(10) Patent No.: US 11,741,405 B2
(45) Date of Patent: Aug. 29, 2023

(54) TICKET-AGENT MATCHING AND AGENT SKILLSET DEVELOPMENT

(71) Applicant: International Business Machines Corporation, Armonk, NY (US)

(72) Inventors: Rohit Avinash Mujumdar, Atlanta, GA (US); Shubhi Asthana, Santa Clara, CA (US); Pawan Chowdhary, San Jose, CA (US); Aly Megahed, San Jose, CA (US); Bing Zhang, College Station, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 17/184,327

(22) Filed: Feb. 24, 2021

(65) Prior Publication Data
US 2022/0270019 A1 Aug. 25, 2022

(51) Int. Cl.
*G06Q 10/0631* (2023.01)
*G06Q 10/0639* (2023.01)
(Continued)

(52) U.S. Cl.
CPC ... *G06Q 10/063112* (2013.01); *G06F 16/245* (2019.01); *G06Q 10/06395* (2013.01);
(Continued)

(58) Field of Classification Search
CPC .............................................. G06Q 10/063112
See application file for complete search history.

(56) References Cited

U.S. PATENT DOCUMENTS 5,306,154 A * 4/1994 Ujita ................... G09B 9/00
434/323
6,288,753 B1 * 9/2001 DeNicola ............... H04N 7/147
348/14.07

(Continued)

OTHER PUBLICATIONS

Alipour, Mehrdad, Mahdi Salehi, and Ali Shahnavaz. "A study of on the job training effectiveness: Empirical evidence of Iran." International journal of business and management 4.11 (2009): 63-68. (Year: 2009).*

(Continued)

*Primary Examiner* — Rutao Wu
*Assistant Examiner* — Zahra Elkassabgi
(74) *Attorney, Agent, or Firm* — Amin, Turocy & Watson, LLP

(57) ABSTRACT

Embodiments are provided for ticket-agent matching and agent skillset development. In some embodiments, a system includes a processor that executes computer-executable components stored in memory. The computer-executable components can include a matching component that determines, using a ticket profile and a space of agent profiles, a ticket-agent pair including a ticket identifier of a service request and an agent identifier of a particular agent within a pool of agents. The computer-executable components also can include a rematching component that assigns a second agent identifier to the service request to develop a skillset of a second particular agent within the pool of agents, the second agent identifier being associated with an unsatisfactory skill score for a defined skill to resolve the service request.

20 Claims, 17 Drawing Sheets

(51) Int. Cl.
*G06Q 10/20* (2023.01)
*G06F 16/245* (2019.01)
*G06Q 10/10* (2023.01)

(52) U.S. Cl.
CPC ....... *G06Q 10/06398* (2013.01); *G06Q 10/10* (2013.01); *G06Q 10/20* (2013.01)

(56) References Cited

U.S. PATENT DOCUMENTS

| | | | |
|---|---|---|---|
| 6,850,895 B2 | 2/2005 | Brodersen et al. | |
| 6,857,668 B2* | 2/2005 | Otten | F16L 15/003 |
| | | | 285/333 |
| 7,916,858 B1* | 3/2011 | Heller | H04M 3/5175 |
| | | | 379/265.12 |
| 8,804,941 B2 | 8/2014 | Werth et al. | |
| 8,918,789 B2 | 12/2014 | Gatti et al. | |
| 9,392,117 B2 | 7/2016 | Millstein et al. | |
| 10,380,519 B2 | 8/2019 | Shukla et al. | |
| 11,386,803 B1* | 7/2022 | Moreno | G09B 15/00 |
| 2005/0027696 A1* | 2/2005 | Swaminathan | G06Q 10/06 |
| 2010/0010859 A1 | 1/2010 | Ratakonda et al. | |
| 2017/0140315 A1 | 5/2017 | Cao et al. | |
| 2018/0032971 A1 | 2/2018 | Karuppasamy et al. | |
| 2018/0253736 A1 | 9/2018 | Rajaram et al. | |
| 2019/0213524 A1 | 7/2019 | Perry et al. | |
| 2020/0097865 A1 | 3/2020 | Hamilton et al. | |
| 2021/0014136 A1* | 1/2021 | Rath | G06Q 30/016 |

OTHER PUBLICATIONS

Krishnan, "Agent Score-Based Intelligent Incident Allocation Engine" Springer Nature (2021): 298-309 (Year: 2021).*

Karve, "Who ya gonna call?", LAN Magazine, vol. 10, No. 9, pagination 63(6), United Business Media LLC., published Sep. 1, 1995, 17 pages.

"Leveraging Social Media Contributions for Dynamic skill-based Routing," ip.com, IPCOM000235940D, published anonymously on Mar. 31, 2014, 4 pages.

Mell et al., "The NIST Definition of Cloud Computing," Recommendations of the National Institute of Standards and Technology, NIST Special Publication 800-145, Sep. 2011, 7 pages.

* cited by examiner

| Ticket\Skill | Skill$_1$ | Skill$_2$ | Skill$_3$ | Skill$_4$ | Skill$_5$ | |
|---|---|---|---|---|---|---|
| ticket$_1$ | 1 | 0 | 1 | 0 | 0 | ⇒ $s_1$ |
| ticket$_2$ | 1 | 0 | 1 | 1 | 0 | |
| ticket$_k$ | 0 | 0 | 0 | 1 | 0 | |

| ID \ Skill | Skill$_1$ | Skill$_2$ | Skill$_3$ | Skill$_4$ | Skill$_5$ | |
|---|---|---|---|---|---|---|
| ID$_1$ | 1 | 0 | 3 | 7 | 0 | ⇒ S$_1$ |
| ID$_2$ | 5 | 5 | 1 | 1 | 0 | ⇒ S$_2$ |
| ⋮ | ⋮ | ⋮ | ⋮ | ⋮ | ⋮ | ⋮ |
| ID$_N$ | 0 | 0 | 0 | 10 | 0 | ⇒ S$_N$ |

0 = Unskilled
1 = Beginner
2 = Novice
⋮
9 = Advanced
10 = Expert

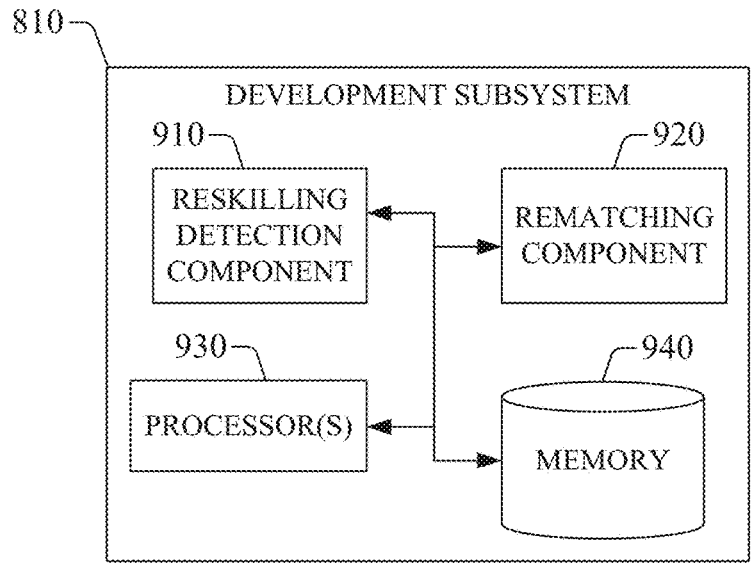

FIG. 9A

```
If trigger signal is FALSE, return empty list
Else:
    list_of_all_tickets = Create list of all tickets in match-list
    for each ticket-agent pair in match-list:
        ticket_skills_list = extract skills for this ticket
        sibling_skill_set = empty()
        for each skill in ticket_skills_list :
            sibling_skills = skill.siblings()
            sibling_skill_set.add(sibling_skills)
        skill_to_be_developed = argmin(sibling_skill_set,agent_skill_cap_matrix)
        new_ticket = list_of_all_tickets.select(skill_to_be_developed)
         s.t. new_ticket not already assigned to this/another agent
         new_agent_ticket_list [ agent ] = new_ticket
```

TICKET-AGENT MATCHING AND AGENT SKILLSET DEVELOPMENT

BACKGROUND

The subject disclosure relates to ticket-agent matching and agent skillset development.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include a matching component that determines, using a ticket profile and a space of agent profiles, a ticket-agent pair including a ticket identifier of a service request and an agent identifier of a particular agent within a pool of agents. The computer-executable components also include a rematching component that assigns a second agent identifier to the service request to develop a skillset of a second particular agent within the pool of agents, the second agent identifier being associated with an unsatisfactory skill score for a defined skill to resolve the service request.

According to another embodiment, a computer-implemented method is provided. The computer-implemented method includes determining, by a computing system, using a ticket profile and a space of agent profiles, a ticket-agent pair including a ticket identifier of a service request and an agent identifier of a particular agent within a pool of agents. The computer-implemented method also includes assigning, by the computing system, a second agent identifier to the service request to develop a skillset of a second particular agent within the pool of agents, wherein the second agent identifier is associated with an unsatisfactory skill score for a defined skill to resolve the service request.

According to a further embodiment, a computer program product for provision of recommendations for program code. The computer program product includes a computer-readable storage medium having program instructions embodied therewith. The program instructions are executable by a processor to cause the processor to determine, by the processor, using a ticket profile and a space of agent profiles, a ticket-agent pair including a ticket identifier of a service request and an agent identifier of a particular agent within a pool of agents. The program instructions are further executable by a processor to cause the processor to assign, by the processor, a second agent identifier to the service request to develop a skillset of a second particular agent within the pool of agents, wherein the second agent identifier is associated with an unsatisfactory skill score for a defined skill to resolve the service request.

BRIEF DESCRIPTION OF THE DRAWINGS

FIG. 9A illustrates another non-limiting example of a computing subsystem for development of a skillset of an agent, in accordance with one or more embodiments described herein.

FIG. 9B illustrates a non-limiting example of an algorithm to update an extant ticket-agent match list, in accordance with one or more embodiments described herein.

DETAILED DESCRIPTION

Figure 1:
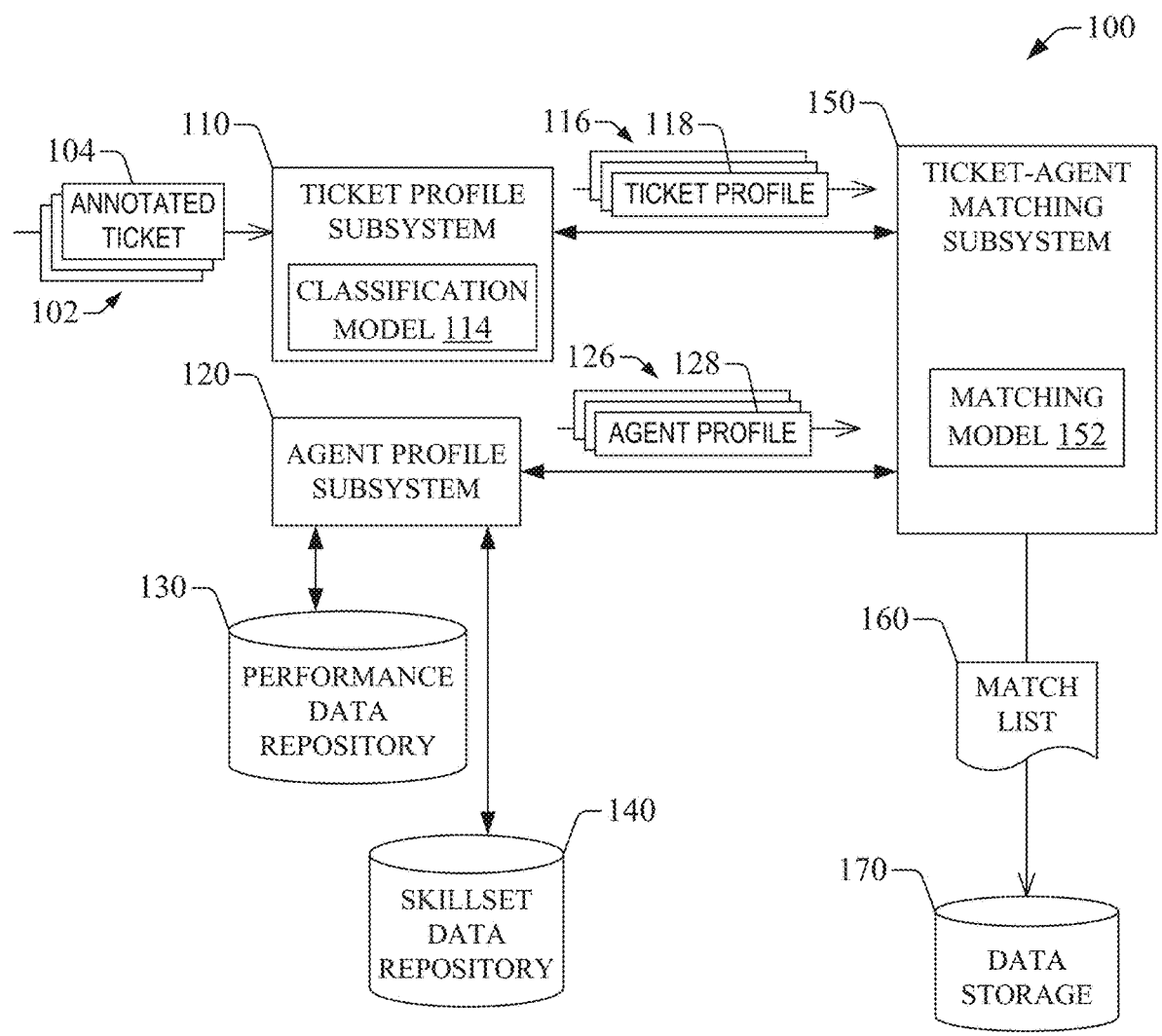
FIG. 1 illustrates a non-limiting example of a computing system for ticket-agent matching and agent skillset development, in accordance with one or more embodiments described herein.

Embodiments of the disclosure address the issues of determining a satisfactory match between a ticket and an agent within a team and developing the skillsets of agents within the team. Embodiments of the disclosure can generate a multiple ticket profiles for respective tickets corresponding to respective service requests. A ticket profile represents a difficulty level and skills involved in the resolution of a service request characterized by a ticket. In some embodiments, the multiple ticket profiles form a space of first vectors, each corresponding to a ticket profile. The service request can, in some cases, be a request for information pertaining to a service provided by a computing platform. Examples of that information include one or a combination of pricing of the service, features of the services, or availability of the service. In addition, or in other cases, the service request can include a request to troubleshoot functionality the service. The ticket can thus include data defining multiple attributes pertaining to the service request, for example. Simply for purposes of illustration, resolution of the service request—or resolution of the ticket characterizing the service request—can refer to either provision of request information or restoration of service functionality.

In addition, embodiments of the disclosure also can generate multiple agent profiles for respective agents in a set of multiple agents (which is referred to as a pool of agents). An agent can be a device, hardware, software, artificial intelligence component, an autonomous component (such as bot or an intelligent assistant) or a human. The autonomous component can be embodied, in some cases, in an automated computing device that implements machine-learning techniques in order to make autonomous inferences based on various types of input data, including video data, audio data, structured data, unstructured data, a combination thereof, or similar information. An agent profile can characterize the efficacy of an agent in resolving service requests. Such an efficacy can be quantified based on historical performance attributes of the agent and proficiency of the agent at different types of skills that may be involved in resolving service requests. In some embodiments, the multiple agent profiles form a space of second vectors, each corresponding to an agent profile.

Embodiment of the disclosure can then determine a match between a ticket identifier (ID) representing a particular service request that has not been previously addressed, and an agent ID. The match can be based on finding a solution to an optimization problem with respect to a first optimization function and a second optimization collective, under defined constraints involving time available for resolution of service requests and current workload of agents in the pool of agents.

Embodiments of the disclosure also can evaluate the quality of matches resulting from the optimization problem. Such an evaluation can be accomplished by determining success ratings of agents in the pool of agents using data identifying actual ticket resolution time and other data defining predicted ticket resolution times. Further, or in other embodiments, expected load conditions in the pool of agents can be monitored. In some load conditions, embodiments of the disclosure can reconfigure an optimized arrangement of ticket-agent pairs in order to permit the development of a skillsets of agents. Because under such conditions, performance of a particular subset of agents may be less influential to the overall performance of the pool of agents, such reconfiguration can lead to ticket-agent matches where refinement and/or addition of skills can be achieved for an agent.

By finding ticket-agent pairs that are essentially optimal, embodiments of the disclosure can improve the performance of a computational platform utilized to resolve tickets. A ticket-agent pair identified as is described herein can result in more efficient use of computing resources (processing unit time, storage, and network bandwidth, for example) compared to a non-optimal ticket-agent pair. Development of skillsets of agents can lead to more optimal ticket-agent matches over time, with the ensuing improved use of computing resources.

With reference to the drawings, FIG. 1 illustrates an example of a computing system 100 for ticket-agent matching, in accordance with one or more embodiments described herein. The computing system 100 includes a ticket profile subsystem 110 that can receive multiple annotated tickets 102, including an annotated ticket 104. Here, an annotated ticket can be embodied in a data structure that can include first data defining an issue pertaining to a service. The data structure also can include second data defining ticket attributes and/or including customer data corresponding to the ticket. The service can be provided by a computing platform, for example. Ticket attributes can include, in some cases, market, geography, business division, ticket type, and sales stage. Ticket attributes can indicate, individually or collectively, a complexity of a ticket. Customer data can include, in some cases, deal size or the type of customer (e.g., returning customer or new customer), or both. Simply for purposes of illustrations, deal value can refer to value of a potential transaction between a service provider that administers the computing platform and a customer. In some embodiments, a combination of ticket attributes and customer data can indicate a complexity of a ticket.

Figures 2A, 2B:
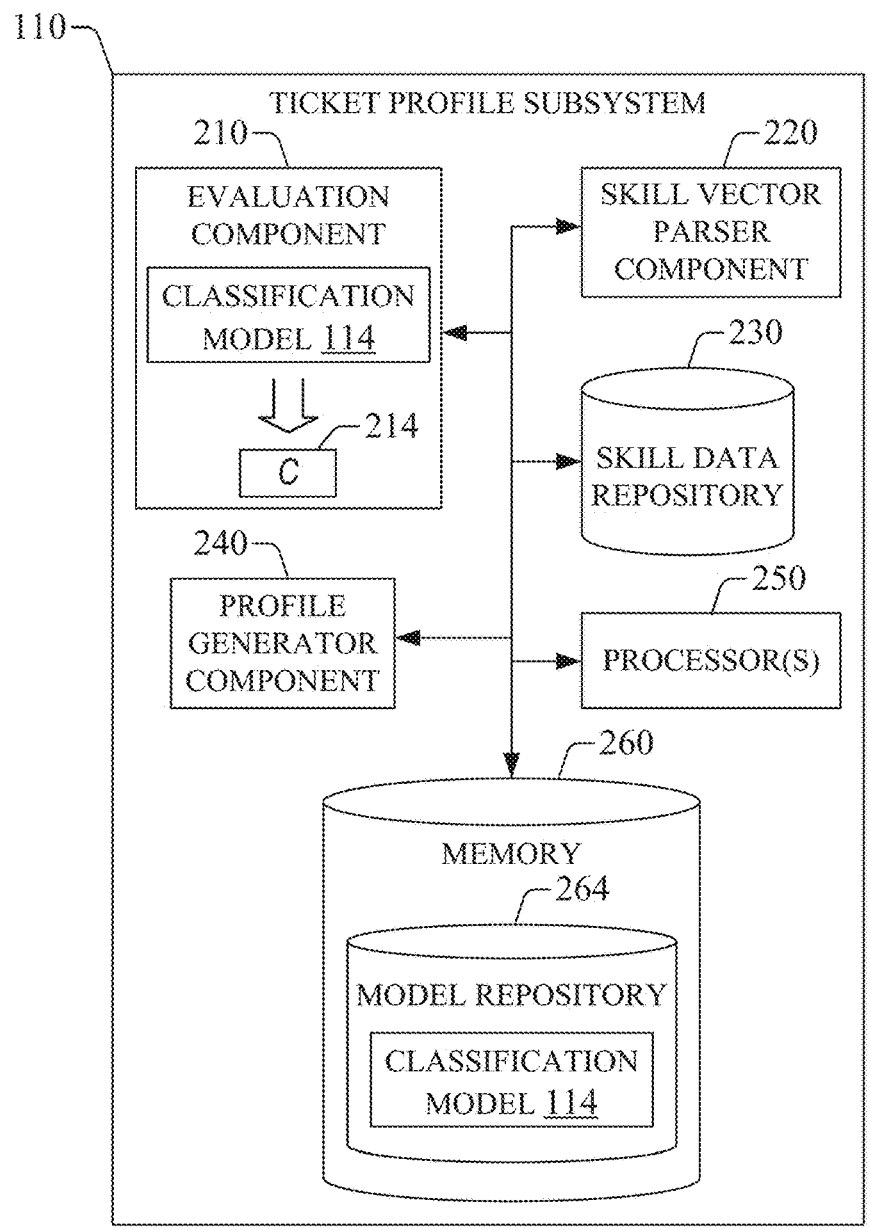
FIG. 2A illustrates a non-limiting example of a computing subsystem for generation of a ticket profile, in accordance with one or more embodiments described herein.
FIG. 2B illustrates a non-limiting example of a ticket-skill presence matrix, in accordance with one or more embodiments described herein.

The ticket profile subsystem 110 can use a classification model 114 to assess the complexity of the received annotated tickets 102. As such, the ticket profile subsystem 110 can assess the complexity of the annotated ticket 104 by applying the classification model 114 to the annotated ticket 104. More specifically in some embodiments, as is illustrated in FIG. 2A, the ticket profile subsystem 110 can include an evaluation component 210 that can generate a complexity attribute 214 by applying the classification model 114 to the annotated ticket 104. The complexity attribute 214 is denoted by C in FIG. 2A. The classification model 114 can perform a multi-class classification task in response to being applied to the annotated ticket 104. The multi-class classification task can include discerning a particular difficulty category among a group of multiple difficulty categories. The group of multiple difficulty categories can be ordered and can be represented by an ordered set of parameters. Those parameters can be numerical, alphabetical, or alphanumeric. In some cases, the ordered set of parameters can be an ordered set of integers or real numbers. In one example, the number of difficulty categories in that group can be five, represented by the following integer numbers: 1, 2, 3, 4, and 5, where 1 represents the least difficulty and 5 represents the greatest difficulty). The number of difficulty categories that constitute the group of difficulty categories is configurable, and, thus, more or fewer than five difficulty categories can be contemplated.

The classification model 114 can be embodied in one of numerous types of models that can perform classification of data having categorical attributes. As an illustration, the classification model 114 can be embodied in a random forest model; a logistic regression; a support vector machine; a decision tree; a boosting model; an ensemble of different classifiers; a neural network based on a model for a classification task; or another type of model that can be trained to discern a difficulty category of an annotated ticket among a group of difficulty categories.

As is illustrated in FIG. 2A, the ticket profile subsystem 110 can include one or many memory devices 260 (referred to as memory 260) including a model repository 264 that retains the classification model 114. The evaluation component 210 can obtain the classification model 114 from the model repository 264. In one example, the evaluation component 130 can load the classification model 114 from the model repository 264. The evaluation component 210 can then apply the classification model 114 to the annotated ticket 104 to generate the complexity attribute 214. As is also illustrated in FIG. 2A, the ticket profile subsystem 110 also can include one or many processors 250, multiple components, and data repositories. The processor(s) 250, the multiple components, and the data repositories can be electrically, optically, and/or communicatively coupled to one another.

The ticket profile subsystem 110 also can assess the complexity of other annotated tickets included in the received annotated tickets 102 by applying the classification model 114 to respective ones of the other annotated tickets. For each one of those other annotated tickets, the ticket profile subsystem 110 can generate a complexity attribute as is described above.

The ticket profile subsystem 110 can use the assessed complexity of annotated tickets included in the received annotated tickets 102 in order to generate respective ticket profiles 116, as is shown in FIG. 1. As such, the ticket profile subsystem 110 can use the complexity of the ticket corresponding to the annotated ticket 104 to generate a ticket profile 118. To that end, the ticket profile subsystem 110 can use the complexity attribute 214 and a skill vector S representing a skillset that can be utilized to resolve the ticket. The ticket profile subsystem 110 can include a skill vector parser component 220 (FIG. 2A) that can obtain the skill vector s from a skill data repository 230 (FIG. 2). In one example, the skill data repository 230 can contain a ticket-skill presence matrix that identifies the skills to be applied to resolve a ticket. The ticket-skill presence matrix can be embodied in a one-hot matrix with tickets as the rows and skills as the columns. That is, the ticket-skill presence matrix is composed by vectors (row vectors or column vectors), each vector having multiple elements where each element is either a 0 or 1. Accordingly, a row vector of the ticket-skill presence matrix can embody a skill vector $s_j$ for a ticket j. Simply as an illustration, an example of a ticket-skill presence matrix is shown in FIG. 2B.

Further, as mentioned, the complexity attribute 214 (FIG. 2A) can be an integer number c within an ordered set of integer numbers, where c represents a category of difficulty of the ticket. The ticket profile subsystem 110 can include a profile generator component 240 (FIG. 2A) that can then generate a skill complexity vector (SCV) by multiplying the integer c and the skill vector s; namely, SCV=c·s. The skill complexity vector can embody the ticket profile 118. It is noted that that the complexity attribute 214 is not limited to being an integer number. Indeed, in some embodiments, the classification attribute 214 can be a numeric parameter within an ordered set of numeric parameters representing a group of difficulty categories, as is described herein.

The ticket profile subsystem 110 can generate tickets profiles for other annotated tickets included in the received annotated tickets 102 as is described above. As a result, in some embodiments, each one of those ticket profiles can be included in the ticket profiles 116 and can be embodied in a skill complexity vector.

As is illustrated in FIG. 1, the computing system 100 also includes an agent profile subsystem 120 that can characterize an agent from a pool of agents in terms of capability to resolve a ticket. Such capability can be defined in terms of readiness, availability, and/or past performance, for example. More specifically, the agent profile subsystem 120 can generate multiple agent profiles 128, including an agent profile 128. Each one of the agent profiles 126 characterizes a respective agent in one or many of those terms. To that end, the agent profile subsystem 120 can be functionally coupled to a performance data repository 130 and to a skillset data repository 140. The performance data repository 130 can include, in some cases, data representative of historical performance of each agent in the pool of agents with respect to a group of skills. The skillset data repository 140 can include data representative of skills available to an agent and proficiency in those skills. The agent profile subsystem 120 can obtain first data from the performance data repository 130 for the agent and also can obtain second data from the skillset data repository 140 for the agent. The agent profile subsystem 120 can then generate the agent profile 128 using the first data and the second data. The agent profile subsystem 120 can generate other agent profiles for respective agents by obtaining such first data and second data for those other agents.

Figure 3A:
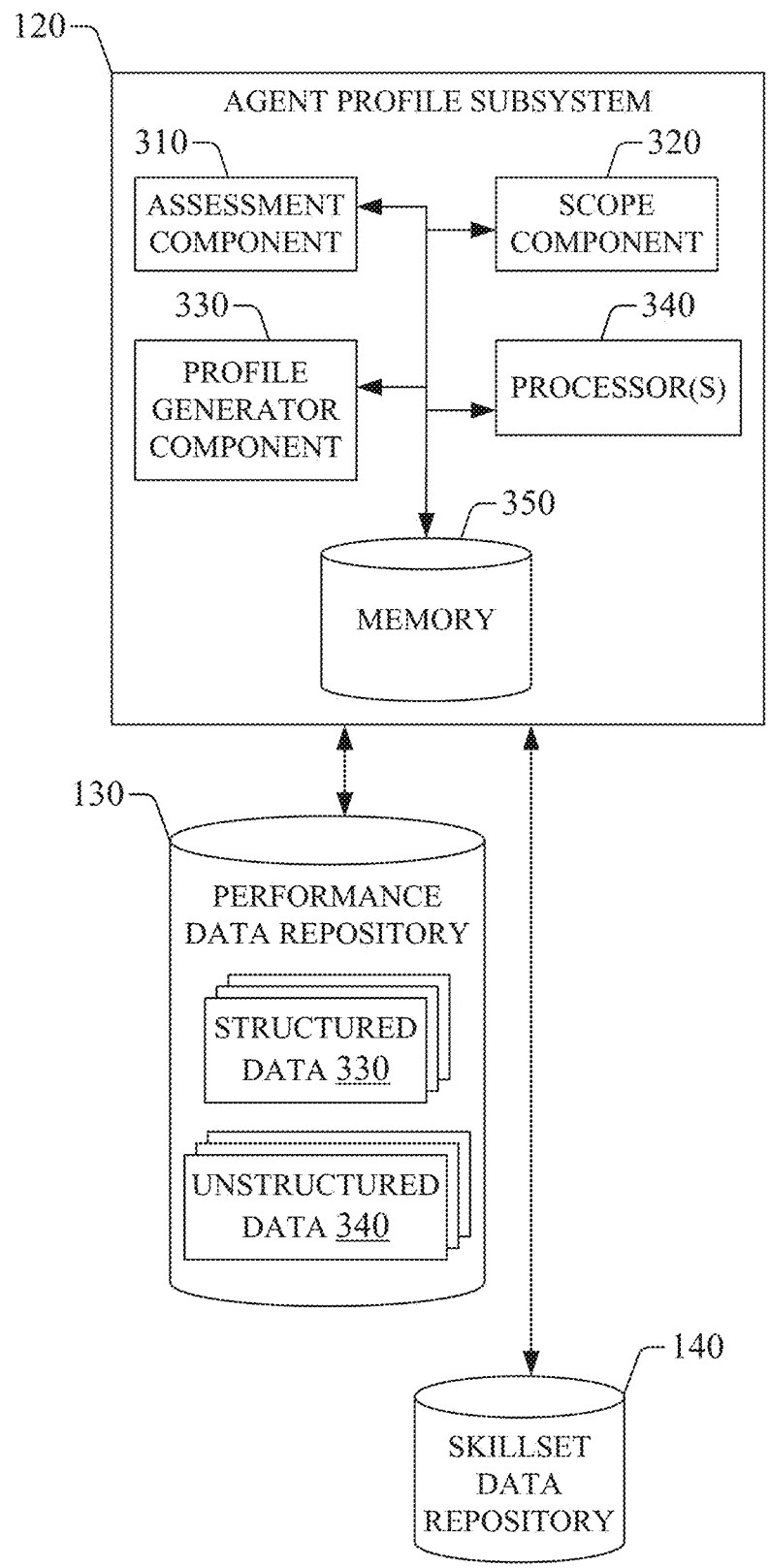
FIG. 3A illustrates a non-limiting example of a computing subsystem for generation of agent profiles, in accordance with one or more embodiments described herein.

The agent profile subsystem 120 can generate the agent profile 128 and other ones of the agent profiles 126 in many ways. In some embodiments, as is illustrated in FIG. 3A, the performance data repository 130 can include structured data 330 representing performance reviews of each agent in a pool of agents. For example, the structured data 330 can include first scores given to defined performance attributes of a first agent in the pool of agents and second scores given to the defined performance attributes of a second agent in the pool of agents. Simply for the sake of illustration, performance attributes can include business impact, client impact, innovation, and similar attributes. In some cases, the structured data 330 can be configured as a table having performance attribute as one column and corresponding score as another column. In addition, or in other embodiments, the performance data repository 130 can include unstructured data 340 also representing historical performance of at least one agent in the pool of agents. The unstructured data 340 can include unstructured textual data defining performance review comments, in some cases.

In those embodiments, the agent profile subsystem 120 can include an assessment component 310 (FIG. 3A) that can evaluate efficacy of an agent in resolving a ticket. The agent profile subsystem 120 also can include one or many processors 340, multiple components, and one or more memory devices 350 (referred to as memory 350). The processor(s) 250, the multiple components, and the memory 350 can be electrically, optically, and/or communicatively coupled to one another. To evaluate such an efficacy, the assessment component 310 can obtain a first dataset from the structured data 330 for the agent. The first dataset can embody a performance review for the agent, for example. The assessment component 310 can determine a summary score Σ for the agent using the first dataset. In particular, the assessment component 310 can add all scores for respective performance attributes identified in the first dataset, and can then assign the result of the addition to Σ. The summary score Σ can be referred to as a Structured Review Score (SRS). In some cases, the assessment component 310 includes a review valuation component 360 (FIG. 3B) that can determine the summary score Σ as is described above.

Further, the assessment component 310 also can obtain a second dataset from the unstructured data 340 for the agent. The second dataset can include unstructured text corresponding to one or several performance review comments for the agent. The assessment component 310 can then determine a valence score σ for the agent using the second dataset. The valence score σ represents a sentiment conveyed by the unstructured text. The valence score σ can be a real number in the interval [0,1], for example, where 1 represents a most positive sentiment and 0 represents a most negative sentiment. To determine σ, in some cases, the assessment component 310 can include a keyword detection component 370 (FIG. 3B) that can determine the presence of a defined word or a defined phrase (e.g., a sequence of more than one defined word in particular order; referred to as a keyphrase). The defined word and the defined phrase convey one of strong points or weak elements of performance of the agent. Thus, the defined keyword can be an adjective ("stellar," "superior," "weak," or "cataclysmic," for example) and the defined keyphrase can be a phrase characterizing an aspect of performance (e.g., "needs mentoring" or "go getter," for example).

The keyword detection component 370 can apply techniques specific to identification or spotting of keywords instead of relying on full-fledged speech recognition. Here, keywords can be identified individually (as individual words, for example) or in groups, each containing two or more words. One such group can be referred to as a keyphrase. In some configurations, the keyword detection component 370 can apply a keyword model to the unstructured text. The keyword model is directed to representing one or several keywords, such as "go getter" or "needs improvement," and predicting or otherwise providing a probability that unstructured text contains the defined keyword(s). As an illustration, the keyword model can include a hidden Markov model (HMM) and/or a Gaussian mixture model.

Further, the assessment component 310 also can include a sentiment analysis component 380 (FIG. 3B) that can perform a sentiment analysis of the detected defined keyword(s) (e.g., word(s) or phrase(s)) by applying one of various sentiment models. Such sentiment models can include, for example, valence-arousal-dominance (VAD) model and EmotionLexicon). Other models and/or techniques that can permit performing sentiment analysis also can be used to analyze the detected defined keyword(s). Performing the sentiment analysis results in the valence score σ.

The assessment component 310 that can then determine an overall performance score P for the agent by multiplying Σ and σ; namely, P=σΣ. The overall performance score P is indicative of the efficacy of an agent in resolving tickets. In some embodiments, the assessment component 310 also can include a score generator component 390 (FIG. 3B) that can receive Σ and σ and can determine P.

Figures 3B, 4A:
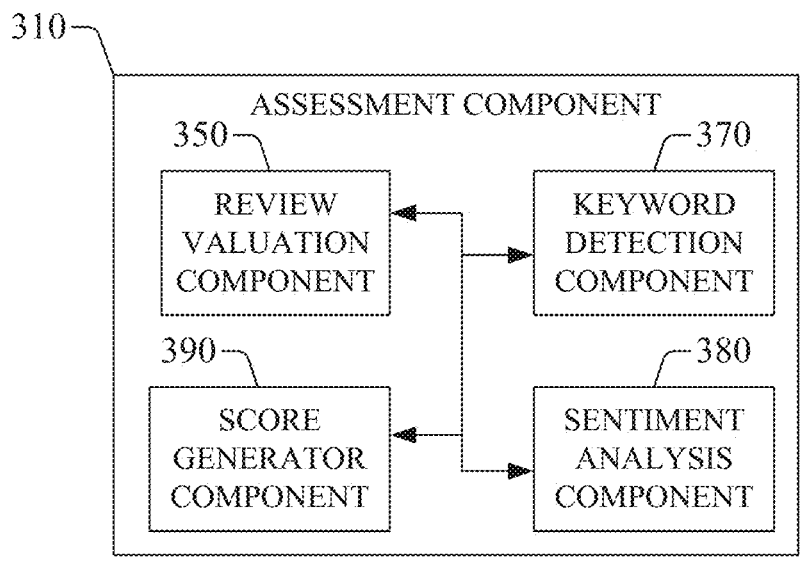
FIG. 3B illustrates a non-limiting example of a component for overall performance score for an agent, in accordance with one or more embodiments described herein.
FIG. 4A illustrates a non-limiting example of an agent-skill matrix representing skillsets of a pool of agents, in accordance with one or more embodiments described herein.
Figure 4B:
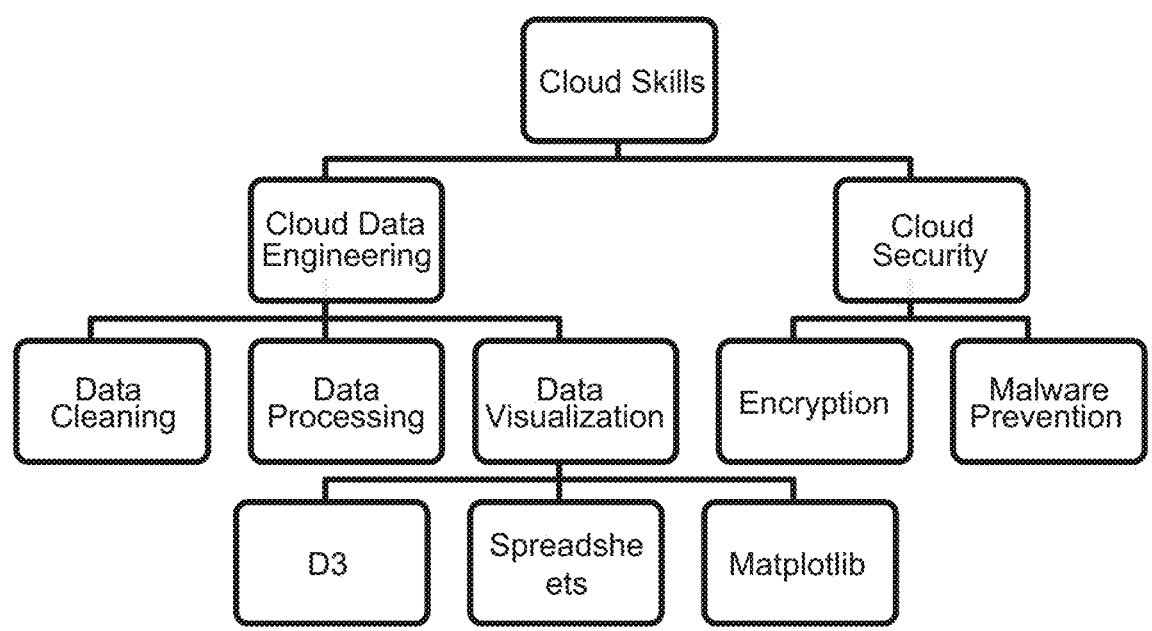
FIG. 4B illustrates a non-limiting example of a hierarchical structure of skills available for resolution of a ticket, in accordance with one or more embodiments described herein.

The efficacy of the agent in resolving tickets (represented by P) is directed to how an agent can perform and, as is described herein, such an efficacy can be based on historical performance attributes of the agent and proficiency of the agent at different types of skills that may be involved in resolving service requests. To match an agent to the ticket corresponding to the annotated ticket 104, such an efficacy can be combined with a scope of skills of the agent. The agent profile subsystem 120 can quantify the scope of skill of the agent by using data contained in the skillset data repository 140. As mentioned, such data can be arranged in an agent-skill matrix that can be updated over time, thus covering temporal changes to agent skillsets. In some embodiments, as is illustrated in FIG. 4A, the agent-skill matrix can have agent identifiers (IDs) as rows and skill records as columns. Even if skills are organized in a hierarchical structure, the structure is flattened and, thus, each column in the agent-skill matrix represents a skill present in the hierarchical structure. An example of such a hierarchical structure is illustrated in FIG. 4B.

Back to FIG. 4A, each element of the agent-skill matrix can be embodied in a score indicating a strength of a particular skill for an agent ID, for example. Such a score can be graded on a scale from 0 to 10, in some cases, with 10 representing the highest strength of expertise and 0 representing absence of expertise. In other words, a matrix element being equal to 10 indicates that the agent identified by the agent ID is an expert in the corresponding skill, and another matrix element that is equal to 0 indicates that another agent identified by another agent ID is unskilled in that other corresponding skill.

Regardless of how an element of an agent-skill matrix represents a level of expertise of an agent in a particular skill, each row vector $S_j$ in the agent-skill matrix can embody a scope vector of the skillset of the agent corresponding to agent $ID_i$. The index i is a natural number that identifies such an agent (via agent $ID_i$) within a pool of N agents, with $1 \leq i \leq N$. Here, N is natural number that can have a wide range of magnitudes. In some cases, N can be of the order of 10. In other cases, N can be of the order of 100. In yet other cases, N can be of the order or 1000. In some embodiments, the agent profile subsystem 120 can include a scope component 320 (FIG. 3A) that can quantify the scope of skill of an agent by selecting a row vector S of the agent-skill matrix, for an agent ID corresponding to the agent. The agent profile subsystem 120 also can include a profile generator component 330 that can then determine the agent profile 128 (FIG. 1) by multiplying S by P and assigning the product P·S to the agent profile 128. Such an agent profile 128 can be referred to as skill performance vector (SPV).

The agent profile subsystem 120 can generate other agent profiles for respective agents. Those other agent profiles can be generated in the same manner as the agent profile 128 is generated, as is described above. As a result, in some embodiments, each one of those other agent profiles can be included in the agent profiles 126 and can be embodied in a skill performance vector.

With further reference to FIG. 1, the ticket profile subsystem 110 can supply the ticket profiles 116, including the ticket profile 118, to a ticket-agent matching subsystem 150. The agent profile subsystem 120 can supply the agent profiles 126, including the agent profile 128, to the ticket-agent matching subsystem 150. The ticket-agent matching subsystem 150 can determine a match between an agent and an incoming ticket by applying a matching model 152 to the ticket profiles 116 and the agent profiles 126. The matching model 152 can define one or several objective functions. Applying the matching model 152 to the ticket profiles 116 and the agent profiles 126 includes determining a solution to an optimization problem with respect to the one or several objective functions collectively. The optimization problem can include one or several constraints. Such a solution defines a match between agent and incoming ticket.

In some embodiments, the ticket-agent matching subsystem 150 can determine a solution to an optimization problem with respect to a first optimization function and a second optimization function collectively. The first optimization function can be based on number of assigned tickets $n_a$ in a pool of agents during a particular period (a day or a week, for example) and number of tickets $n_D$ received by the pool of agents during the particular period. The pool of agents can include N agents, as mentioned. The first optimization function can be the number of unassigned tickets $n_D$-$n_a$, for example. A group of constraints that apply to the first optimization function also can be defined. The group of constraints can include, for example, (1) a single agent A within the pool of agents must be allocated an incoming ticket having a particular ticket profile (e.g., ticket profile 118); (2) agent A must not already have an assignment of another ticket; (3) a number of assigned tickets $n_a$ must not exceed $n_D$; and (4) a time $t_{ij}$ available to an agent $A_i$ to work on a ticket $T_1$ must not exceed a threshold time interval $T_0$ (e.g., four hours, six hours, eight hours, eight hours, or 10 hours).

The second optimization function can be embodied in a similarity function $f$ between a ticket profile (e.g., ticket profile 118) and an agent profile (e.g., agent profile 128). In some cases, the ticket profile and the agent profile are embodied in respective vectors V and V' having a same dimension d. The magnitude of d can be the number of skills collective available in a pool of agents. For instance, the ticket profile can be embodied in the ticket profile 118 and the agent profile can be embodied in the agent profile 128. As described herein, the ticket profile can be embodied in a SCV and the agent profile can be embodied in a SPV, where the SCV and the SPV have a same dimension. Thus, in those cases, the similarity function $f$ can be embodied in the cosine similarity among V and V'. The similarity function $f$ also can be embodied in another type of function, such as Minkowsky distance or Manhattan distance.

Accordingly, such an optimization problem can be the concurrent minimization of the number of unassigned tickets $n_D$-$n_a$ and maximization of the similarity function $f$ over a search space including a similarity search subspace and an assignment search subspace.

Figure 5:
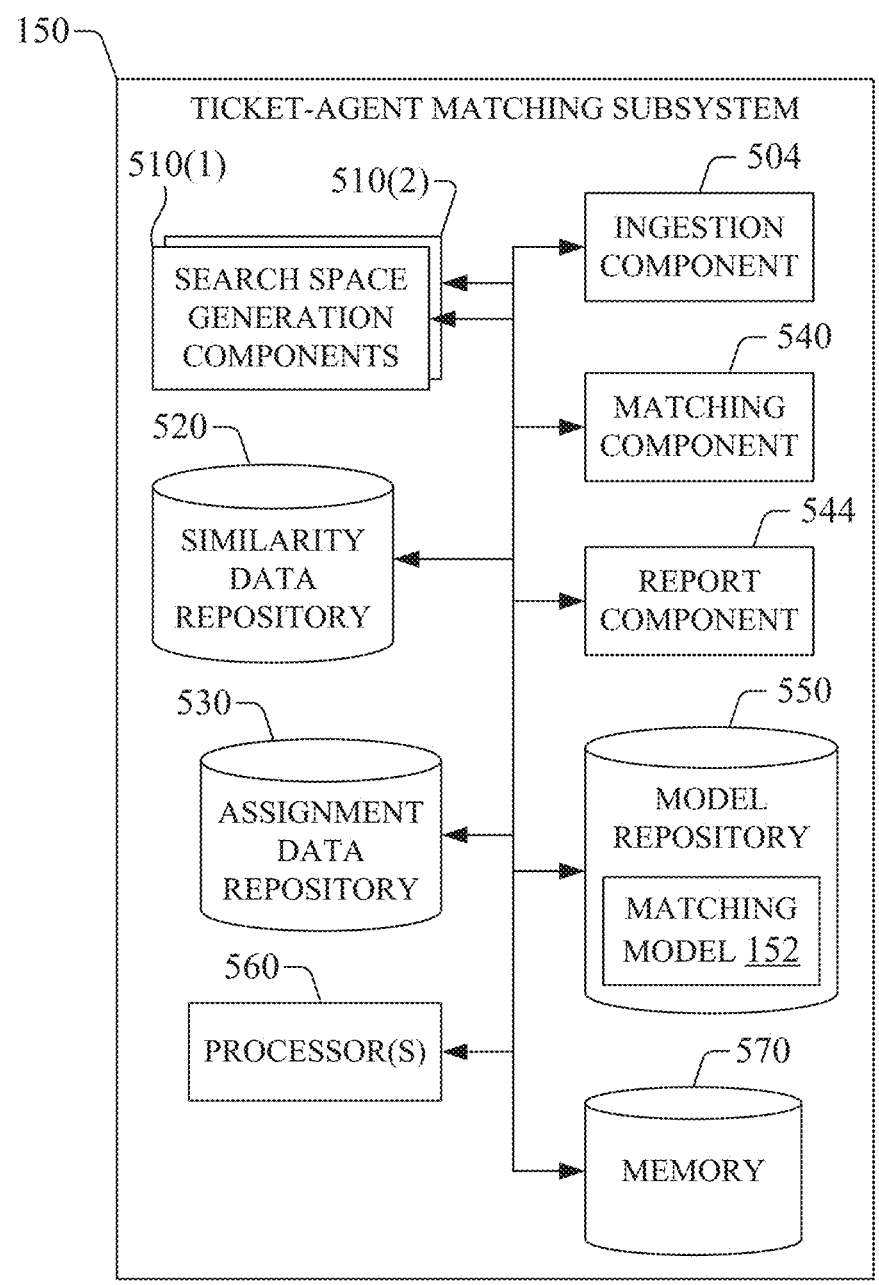
FIG. 5 illustrates a non-limiting example of a computing subsystem for generation of a match between an agent and a ticket, in accordance with one or more embodiments described herein.

To determine a solution to such an optimization problem, in some embodiments, as is illustrated in FIG. 5, the ticket-agent matching subsystem 150 can include an ingestion component 504 that can receive the ticket profiles 116, including the ticket profile 118, and the agent profiles 126, including the agent profile 128. The ticket-agent matching subsystem 150 also can include a first component 510(1) that can generate the similarity search subspace. To that end, the first component 510 can determine a similarity values between the ticket profiles 116 and the agent profiles 126. For instance, the first component 510 can determine similarity values between the ticket profile 118 (FIG. 1) and agent profiles (including the agent profile 128 (FIG. 1)) for each agent in the pool of agents available for resolution of the ticket. As a result of evaluating similarity between the ticket profiles 116 and the agent profiles 126, the first component 510(1) can generate a list of similarity values. The similarity values can be real numbers. Such a list constitutes the similarity search subspace. The size of the similarity search subspace can be of the order of $N^{n_D-n_a}$. The first component 510(1) can retain the list of similarity values in a similarity data repository 520.

The ticket-agent matching subsystem 150 also can include a second component 510(2) that can generate the assignment search subspace. To that end, the second component 510(2) can generate an ensemble of assignment configurations, each assignment configuration defining one way in which $n_A$ tickets out of the $n_D$ tickets can be assigned to the N agents in the pool of agents, while satisfying constraints (1) to (4) described above. Such an ensemble constitutes the assignment search subspace. The size of the assignment search subspace can be of the order of $N \cdot n_D$. The second component 510(2) can retain the ensemble of assignment configuration in an assignment data repository 530.

In addition, the ticket-agent matching subsystem 150 can include a matching component 540 that can search the assignment search subspace to determine a particular assignment configuration that minimizes $n_D$-$n_A$ and also maximizes the similarity function $f$. The particular agent profile (e.g., agent profile 128) that maximizes $f$ for that particular assignment configuration corresponds to the agent that matches a particular ticket profile (e.g., ticket profile 118).

Back to referring to FIG. 1, the ticket-agent matching subsystem 150 can generate list of ticket-agent matches. Each match can be represented by a pair including a ticket ID identifying a ticket and an agent ID identifying an agent in a pool of agents. The list can be referred to as a ticket-agent match list 160 (represented by match list 160 in FIG. 1). In some embodiments, a report component 544 (FIG. 5) can generate the list using a solution to the optimization problem described above. The report component 544 can supply the ticket-agent match list 160 to data storage 170 and/or a device that records an assignment of an agent to a ticket. Thus, in one example, the report component 544 can send the match list 160 to the data storage 170 and/or such a device for recordation of the assignment of agent ID corresponding to the agent to the ticket.

Figure 6:
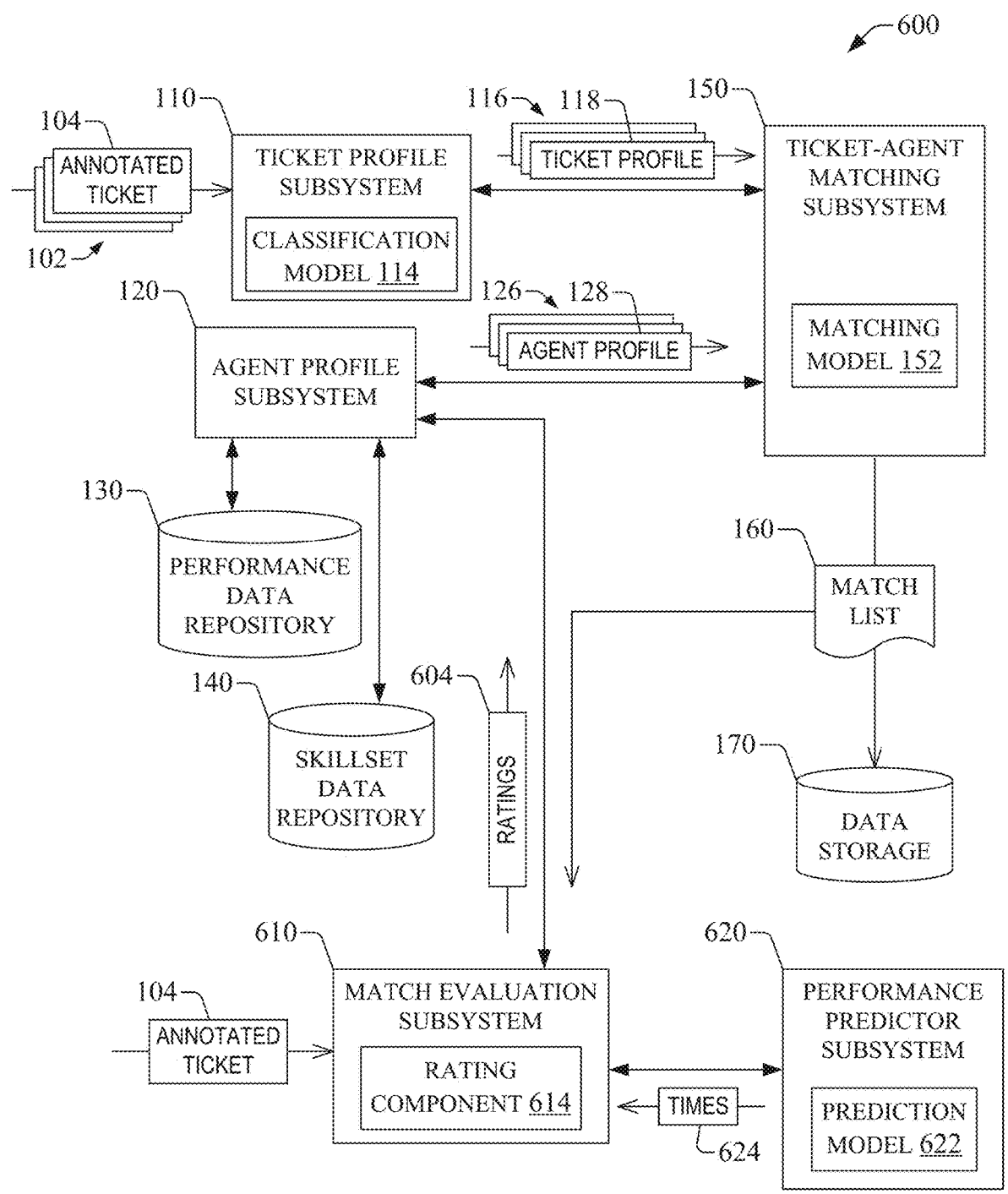
FIG. 6 illustrates a non-limiting example of a computing system for development of a skillset of an agent, in accordance with one or more embodiments described herein.

Because a new ticket can have a particular fact pattern surrounding an issue to be resolved and a ticket-agent match for that ticket is based on historical data, a computing system can include a feedback loop to evaluate the ticket-agent match. FIG. 6 illustrates an example of a computing system 600 for development of a skillset of an agent, in accordance with one or more embodiments described herein.

The computing system 600 includes a match evaluation subsystem 610 that can assess quality of a ticket-agent match. To that point, the match evaluation subsystem 610 can receive, among other things, the annotated ticket 104, the ticket-agent match list 160, and a group of ticket resolution times 624. Each ticket resolution time is, in some embodiments, a predicted time for resolution of a ticket within a defined time interval in the future, for a particular pool of agents. In other words, the ticket resolution time is a predictor of how long it can take the ticket to be resolved, on average, in the upcoming defined time interval, within the particular pool of agents.

A performance predictor subsystem 620 can generate the group of ticket resolution times 624 by applying a prediction model 622 to historical temporal data identifying resolution performance of a pool of agents. The prediction model 622 can include, or can be embodied in, a weighted moving average (WMA) algorithm where service request (SR) volumes can be applied as weight. Thus, the prediction model 622 can include a first parameter defining a history window (or history interval), a second parameter defining a horizon window (or horizon interval), and third parameter defining a rolling window (or rolling interval). The history window identifies a scope of historical temporal data selected for application of the WMA algorithm. The horizon window identifies the defined time interval into the future. The rolling window identifies a time interval to perform moving averages. Those averages can serve as a predictor of the average time for resolution of services requests in a timescale dictated by the time interval.

Simply as an illustration, consider an example scenario in which the history window is 26 weeks, the horizon window is four weeks, and the rolling window is four weeks. For the first four weeks within the history window, respective SR volumes and respective actual resolution times are available.

Namely, for week 1, an SR volume $v_i$ and an actual resolution time $t_a^{(1)}$ are available; for week 2, an SR volume $v_2$ and an actual resolution time $t_a^{(1)}$ are available; for week 3, an SR volume $v_i$ and an actual resolution time $t_a^{(3)}$ are available; and for week 4, an SR volume $v_4$ and an actual resolution time $t_a^{(4)}$ are available. However, respective predicted resolution times are unavailable for each one of weeks 1 to 4 because the rolling window is four weeks. For week 5, an SR volume $v_6$ and an actual resolution time $t_a^{(5)}$ are available. A predicted resolution time $t_a^{(5)}$ also is available and results from a weighted average of the prior historical actual resolution times over the rolling window. Namely, $t_a^{(5)} = v_1 t_a^{(1)} + v_2 t_a^{(2)} + v_2 t_a^{(3)} + v_4 t_a^{(4)}$. For week 6, an SR volume $v_6$ and an actual resolution time $t_a^{(6)}$ are available. A predicted resolution time $t_p^{(6)}$ also is available and results from a weighted average of the prior historical actual resolution times over the rolling window. Namely, $t_p^{(6)} = v_2 t_a^{(2)} + v_3 t_a^{(3)} + v_4 t_a^{(4)} + v_5 t_a^{(5)}$. Predicted resolution times for successive weeks can be calculated in similar fashion up to week 26.

For week 27, the first future week, a SR volume and an actual resolution time are undefined because the history window is 26 weeks. Thus, a predicted resolution time $t_p^{(27)}$ for week 27 can be determined using the horizon window of four weeks. Specifically, $t_p^{(27)}$ can be determined as an average of predicted resolution times for week 23 to week 26: $t_p^{(27)} = t_p^{(23)} + t_p^{(24)} + t_p^{(25)} + t_p^{(26)}$, where each prior predicted resolution time is ascribed a weight equal to unity. Predicted resolution times for subsequent future weeks can be determined similarly, by determining simple moving averages over the horizon window for the subsequent future weeks.

Figure 7A:
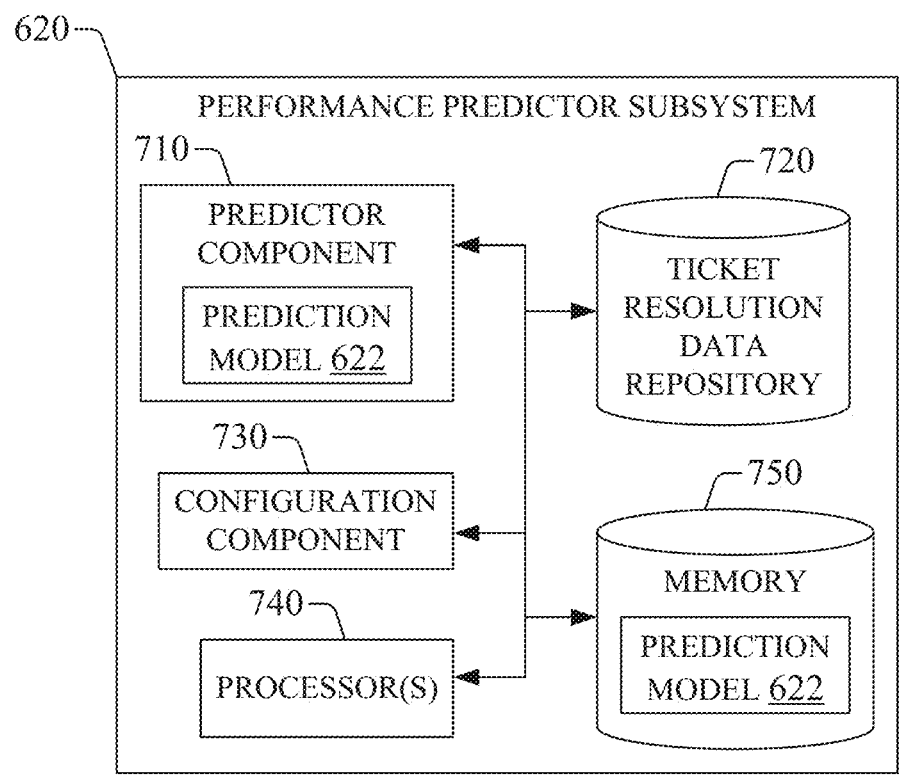
FIG. 7A illustrates a non-limiting example of a computing subsystem for prediction of ticket resolution times, in accordance with one or more embodiments described herein.

As is illustrated in FIG. 7A, in some embodiments, the performance predictor subsystem 620 can include a data repository 720 (referred to as ticket resolution data repository 720) that includes historical temporal ticket data and related SR volume data. The performance predictor subsystem 620 also can include one or many processors 740, one or many components, and one or many memory devices 750 (referred to as memory 750). The processor(s) 740, the component(s), and the memory 750 can be electrically, optically, and/or communicatively coupled to one another. Further, the performance predictor subsystem 620 also can include a predictor component 710 that can generate one or several ticket resolution times by applying the prediction model 622. To that point, the predictor component 710 can load the prediction model 622 from the memory 750, for example. When applying the prediction model 622, in some embodiments, the predictor component 710 can apply the WMA algorithm, to at least a portion of the historical temporal ticket data and related SR volume data. The predictor component 710 can apply the WMA algorithm to such data in order to determine multiple ticket resolution times at various timescales ranging from a first timescale at which historical temporal ticket data is recorded (e.g., daily) to a second timescale greater than the first timescale. For instance, if such ticket data is being recorded daily, the predictor component 710 can apply the WMA to the ticket data to generate ticket resolution times on daily, weekly, monthly, or quarterly timescales.

As is described in the example scenario above, when applying the WMA algorithm for the horizon (or future time intervals), SR volume data is undefined and the predictor component 710 cannot use such data as weights in the weighted average. Accordingly, to determine a predicted resolution time in the horizon, the predictor component 710 can use the predicted resolution times determined recursively in order to perform a simple moving average. In cases in which a configured rolling window is too large for the determining a simple moving average, the performance predictor subsystem 620 can reconfigure the prediction model 622 by performing a window flip. Specifically, the performance predictor subsystem 620 can configure the third parameter defining the rolling window in the prediction model 622 as the difference between the history window and the horizon window. As is illustrated in FIG. 7A, the performance prediction subsystem 620 can include a configuration component 730 that can update the prediction model 622 to include the reconfigured rolling window.

The rolling window need not be static. In some cases, the performance predictor subsystem 620 can dynamically configure the rolling window. To that end, the performance predictor subsystem 620 can apply the prediction model 622 over a range of rolling windows, and can then select a particular rolling window from the range of rolling windows. That particular rolling window can provide a satisfactory prediction error (the least error or the second least prediction error, for example). In some embodiments, the configuration component 730 can select the particular window and can then update the prediction model 622.

During the application of prediction model 622, in some configurations, the predictor component 710 can operate on ticket resolution data in order to normalize the data prior to determining a predicted ticket resolution time. An example of the operations that can be performed include substituting outliers by threshold values at a defined number of standard deviations. Such a defined number can be 2, 3, or 4, for example. Another example of those operations includes interpolation of SR volume data in cases data is unavailable or otherwise undefined. Yet another example of those operations includes using a quarterly average ticket resolution time in case an actual ticket resolution time is unavailable for a particular week.

With further reference to FIG. 6, the match evaluation subsystem 610 also can obtain an actual time $t_a$ elapsed for the resolution of a particular ticket. Such a time can represent an actual resolution performance for an agent identified in a ticket-agent match for that particular ticket. As mentioned, the ticket-agent match can be represented by a pair including a ticket ID and an agent ID. To assess the quality of the ticket-agent match, the match evaluation subsystem 610 can compare the actual resolution performance to a predicted resolution performance. The predicted resolution performance can be represented by the ticket resolution time $t_p$ for the particular ticket. A result of such a comparison can define success rating for the agent.

More specifically, because a satisfactory resolution performance of an agent can be represented by an actual resolution time that is similar to a predicted ticket resolution time, the match evaluation subsystem 610 can determine a ratio $\rho = 1 - t_a/t_p$. The ratio $\rho$ represents a success metric, where a positive value of $\rho$ indicates satisfactory performance and a negative value of $\rho$ indicates unsatisfactory performance. Greater positive values of $\rho$ indicate more successful performance, and greater negative values of $\rho$ indicate more unsuccessful performance. In some embodiments, the match evaluation subsystem 610 can include a rating component 614 that can determine $\rho$ for a particular ticket-agent match.

It is noted that, in some embodiments, $\rho$ can be determined using other functions of $t_a$ and $t_p$. For instance, $\rho = g(t_a, t_p)$, where g is a function that evaluates how similar $t_p$ and $t_a$ are. Here, $\rho$ increases when $t_a < t_p$ and $t_a$ decreases relative to $t_p$. In those embodiments, the rating component

614 also can determine ρ. As an illustration, in one embodiment, $g(t_a,t_p)=\beta/\exp(t_a/t_p)$, with β a positive constant that can be equal to or greater than 1. When $t_a<t_p$ the argument of exp(·) is less than unity, thus the denominator in $g(t_a,t_p)$ decreases with $t_a$. Accordingly, $g(t_a,t_p)$ increases as $t_a$ decreases relative to $t_p$. When $t_a>t_p$, the argument of exp(·) is greater than unity, thus the denominator in $g(t_a,t_p)$ also is greater than unity. Accordingly, $g(t_a,t_p)$ is less than β (e.g., less than unity when β=1). Therefore, for $g(t_a,t_p)=\beta/\exp(t_a/t_p)$, when $t_a>t_p$, less points can be ascribed to an agent instead of ascribing negative points. Again, greater positive values of ρ indicate more successful performance. As another illustration, in another embodiment, $g(t_a,t_p)=\beta(t_p-t_a)/(t_p+t_a)$. When $t_a<t_p$, both the numerator and denominator are positive and, thus, ρ is positive. Accordingly, no penalties are applied to the ticket-agent match corresponding to $t_a$ and $t_p$. If $t_a>t_p$, denominator is positive and numerator is negative, and, thus, ρ is negative. Accordingly, a penalty is applied the ticket-agent match corresponding to $t_a$ and $t_p$. Greater positive values of ρ indicate more successful performance, and greater negative values of ρ indicate more unsuccessful performance.

As mentioned, resolution of a particular ticket involves a particular group of skills. Thus, successful performance can reflect favorably on success rating for each skill in the particular group of skills. Similarly, unsuccessful performance can reflect unfavorably on the success rating for each skill in the particular group of skills. Further, performance of an agent (whether successful or unsuccessful) can change over time as ticket fact patterns change over time. Therefore, the match evaluation subsystem 610 can update, over time, records indicating respective success ratings for at least one of the skills corresponding to an agent. In some embodiments, those records can be retained in a table where each agent in a pool of agents has multiple records for respective skills. A first record of the multiple records indicates a current success rating for a first skill and a second record indicates a current success rating for a second skill. In one example, the first skill can be "encryption" and the second skill can be "data processing." The rating component 614 can update the table, creating or changing records for an agent over time, as the agent is matched with tickets and the agent resolves those tickets.

Simply as an illustration, the rating component 614 can receive the annotated ticket 104 and can then determine that the particular group of skills involved in the resolution of the annotated ticket 104 includes skills $s_q$, $s_r$, and $s_v$ out of a set of M skills $\{s_1, s_2, \ldots s_{M-1}, s_M\}$. Here, M is a natural number and $q<r<v\leq M$. The rating component 614 can determine such a particular group of skills by parsing the annotated ticket 104, for example. The rating component 614 also can obtain $t_a$ and $t_p$ for the annotated ticket 104. The rating component 614 can obtain $t_a$ from a metering component (not depicted in FIG. 6) and can obtain $t_d$ by parsing the group of ticket resolution times 624. The monitor component 610 can then determine ρ. Using ρ, for each one of $s_q$, $s_r$, and $s_v$, the rating component 614 can update a current success rating $R_\lambda$, for skill λ (q, r, and v) by determining $R_\lambda=R_{0,\lambda}+\rho$. The quantity $R_{0,\lambda}$ is an extant success rating resulting from prior successive updates for skill λ. In case the agent has resolved the annotated ticket 104 faster than predicted (e.g., $t_a<t_d$; ρ>0), each one of $R_q$, $R_r$, $R_v$ is a greater than the respective extant success ratings. Thus, a current performance standing of the agent improves. Conversely, in case the agent has resolved the annotated ticket 104 slower than predicted (e.g., $t_a>t_d$; ρ<0), each one of $R_q$, $R_r$, $R_v$ is less that the respective extant success rating. Thus, the current performance standing of the agent deteriorates.

The match evaluation subsystem 610 can supply success ratings 604 for agents to the agent profile subsystem 120. The success ratings 604 can include multiple subsets of ratings, each one of the multiple subsets corresponding to an agent—e.g., a first subset of ratings corresponds to a first agent and a second subset of ratings corresponds to a second agent.

Figure 7B:
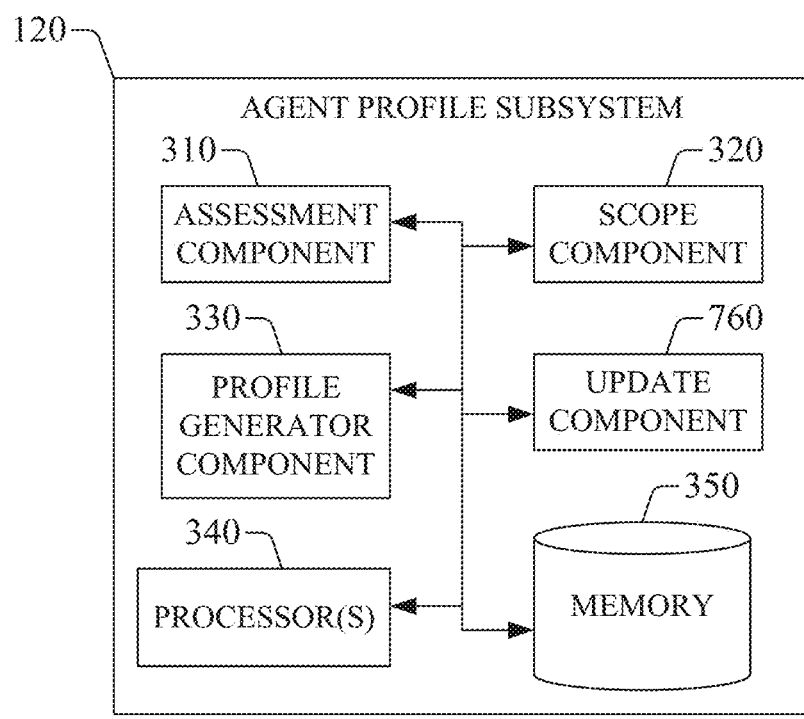
FIG. 7B illustrates another non-limiting example of a computing subsystem for generation of agent profiles, in accordance with one or more embodiments described herein.

The agent profile subsystem 120 can use the success ratings 604 to update the skillset data repository 140. In some embodiments, the agent profile subsystem 120 can include an update component 760 (FIG. 7B) that can receive the success ratings 604. The update component 760 can parse the success ratings 604 and, thus, can identify particular success ratings for an agent. For each success rating $R_\gamma$ of the particular success ratings (where γ is an index representing a skill) the update component 760 can compare $R_\gamma$ to a threshold value. Such a threshold value can be configured by an expert device (not depicted in FIG. 6) for example. In response to $R_\gamma$ exceeding the threshold value, the update component 760 can increase an extant skill score by a defined amount. For instance, the extant skill score can be increased by 1. In response to $R_\gamma$ being equal to or less than the threshold value, the update component 760 can maintain the extant skill score. In response to comparing the particular success ratings for an agent to the threshold value and updating respective skill scores, the update component 760 can update a row vector corresponding to the agent in an agent-skill matrix (see FIG. 4A for an example) retained in the skillset data repository 140.

Figure 8:
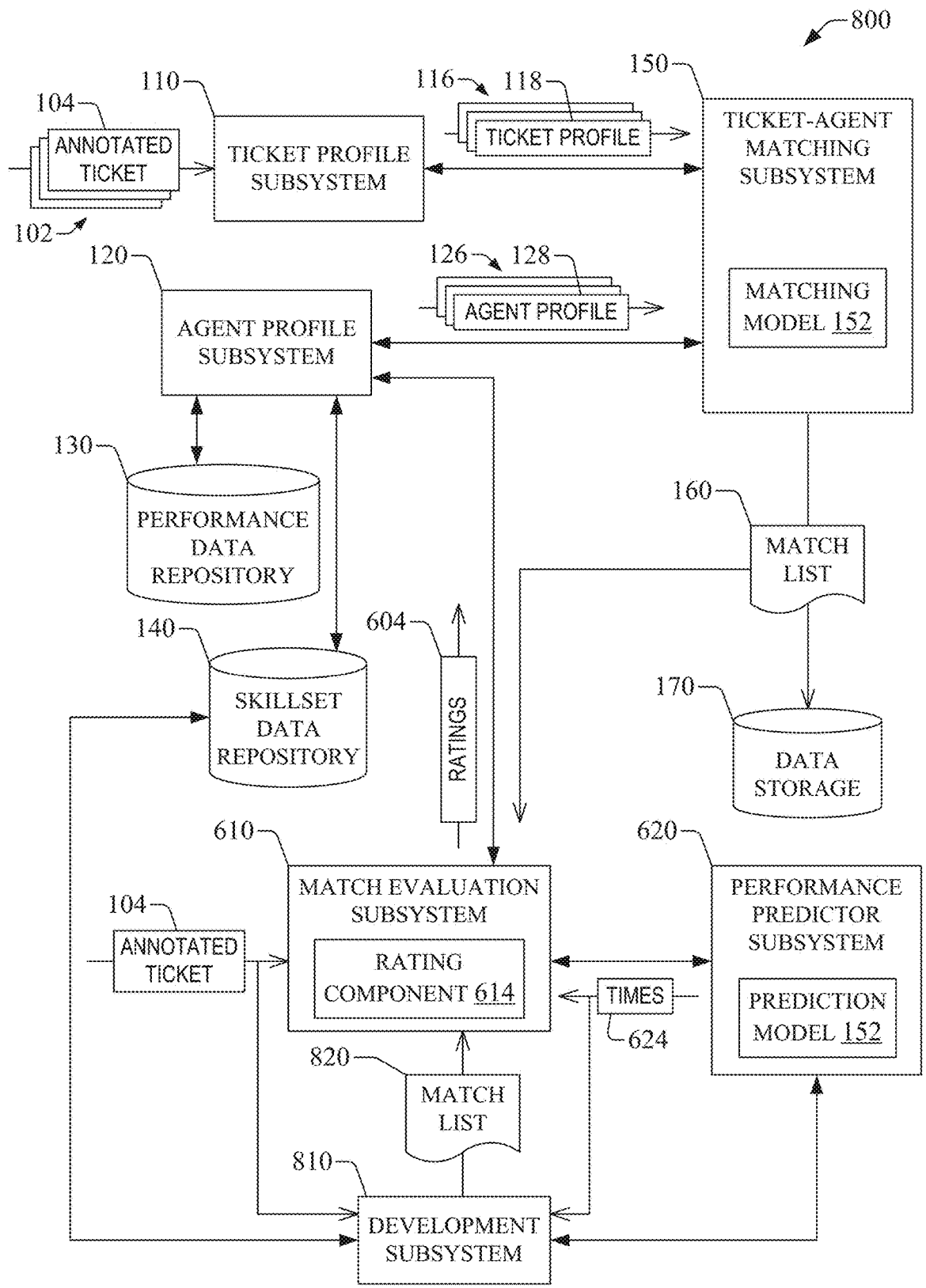
FIG. 8 illustrates a non-limiting example of a computing system for development of a skillset of an agent, in accordance with one or more embodiments described herein.

As mentioned, a skillset of an agent within a pool of agents can evolve over time—the agent can refine extant skills or can incorporate new skills over time, for example. FIG. 8 illustrates an example of a computing system 800 for development of a skillset of an agent, in accordance with one or more embodiments described herein. The computing system 800 includes a development subsystem 810 that can detect a condition for development of skillset of an agent. In response to detecting such a condition, the development subsystem 810 can generate a new list of ticket-agent matches (represented by match list 820 in FIG. 8).

More specifically, in some embodiments, as is illustrated in FIG. 9A, the development subsystem 810 can include a reskilling detection component 910 that can determine if volume of tickets allocated to the pool of agents permits assigning a ticket to an agent that lacks one or several skills for resolution of the ticket. The development subsystem 810 also can include one or many processors 930, multiple components, and one or many memory devices 940 (referred to as memory 940). The processor(s) 930, the components, and the memory 940 can be electrically, optically, and/or communicatively coupled to one another. Lacking a skill can mean that the agent either has applied the skill a limited number of times or has a current skill score that is below a defined threshold. The reskilling detection component 910 can receive the ticket resolution times 624 and can then determine if an average ticket resolution time for a future time interval is less than a threshold amount of time. An affirmative determination indicates that the forthcoming time interval is a no-rush period and, thus, efficacy in resolving tickets can be diminished in favor of developing one or many skills of at least one agent in a pool of agents. In response to such an affirmative determination, the reskilling detection component 910 can configure a trigger signal to indicate that skill development is permitted. In one example, the trigger signal can be a logical variable that the reskilling detection component 910 configures to TRUE in response to such an affirmative determination.

Conversely, a negative determination indicates that efficacy in resolving tickets is to be prioritized. In response to the negative determination, the reskilling detection component 910 can configure the trigger signal to indicate that skill development is not permitted. Thus, continuing with the foregoing example, the reskilling detection component 910 configures the logical variable to FALSE in response to such a negative determination.

The trigger signal is not limited to a logical variable. In some embodiments, the trigger signal can be a numerical variable that the development subsystem 810 can set to a high value (e.g., 1) to indicate that skill development is permitted. The development subsystem 810 also can set the numerical value to a low value (e.g., 0 or −1) to indicate that skill development is not permitted.

The reskilling detection component 910 can send the trigger signal to a rematching component 920 (FIG. 9A). In response to the trigger signal indicating that skill development is permitted, the rematching component 920 can generate the new ticket-agent match list 820 by reconfiguring the ticket-agent match list 160. To that end, the rematching component 920 can identify one or several particular skills related to a group of skills for resolution of a ticket in the ticket-agent match list 160. In some cases, the particular group of skills can pertain to a hierarchy having an arrangement of parent nodes, each parent node having one or many sibling nodes. An example of the hierarchy is shown in FIG. 4B. In those cases, the rematching component 920 can identify at least one of the sibling node(s).

Further, the rematching component 920 can obtain skillset data for an agent from the skillset data repository 140. The skillset data can be embodied in a row column from an agent-skill matrix, the row column being specific to the agent, in some embodiments. The rematching component 920 can then identify a first skill of the particular skill(s), where the first skill is present in the row column and has the least skill score in the row column. That first skill can be developed. To that point, the rematching component 920 can select a particular ticket from the ticket-agent match list 160 that includes the first skill as part of the application of the group of skills for resolution of that particular ticket. The rematching component 920 can then assign the agent to the particular ticket, thus forming a new ticket-agent pair. The rematching component 920 can iterate the foregoing operations for each ticket-agent pair in the ticket-agent match list 160, thus generating the ticket-agent match list 820. That is, the rematching component 920 can update the ticket-agent match list 160 by assigning (iteratively, in some cases) one or more particular agent IDs of respective agents within a pool of agents to respective one or more particular tickets in order to develop a skillset of the respective agent(s). As is described herein, an agent ID of the particular agent ID(s) can be associated with an unsatisfactory skill score for a defined skill to resolve a ticket. In some embodiments, the rematching component 920 can generate the new ticket-agent match list 820 by implementing the example algorithm 950 illustrated in FIG. 9B. It is noted that in the example algorithm 950, the identification of a skill to be developed is accomplished by performing the argmin operation.

Developing the skills in a pool of agents can strengthen the collective skillset of the pool of agents. As a result, such a skillset can be normalized and can permit more efficient assignment of tickets to agents in the pool of agents.

With further reference to FIG. 8, the development subsystem 810 can supply the ticket-agent match list 820 to the match evaluation subsystem 610. The development subsystem 810 also can supply the trigger signal to the match evaluation subsystem 610. A trigger signal indicating that skill development is permitted can cause the match evaluation subsystem 610 to assess quality of ticket-agent matches defined by the ticket-agent match list 820 instead of assessing quality of the matches defined by ticket-agent match list 160. Stated similarly, in situations where a skill is being developed, the match evaluation subsystem 610 can assess the quality of the ticket-agent matches generated for resolution of tickets under reskilling conditions.

The match evaluation subsystem 610 can generate success ratings 604 based, at least partially, on the times 624 and the ticket-agent match list 820, in accordance with aspects described herein. As is described herein, the match evaluation subsystem 610 can supply the success ratings 604 to the agent profile subsystem 120. Again, the agent profile subsystem 120 can use the success ratings 604 to update the skillset data repository 140 in accordance with aspects described hereinbefore.

Figure 10:
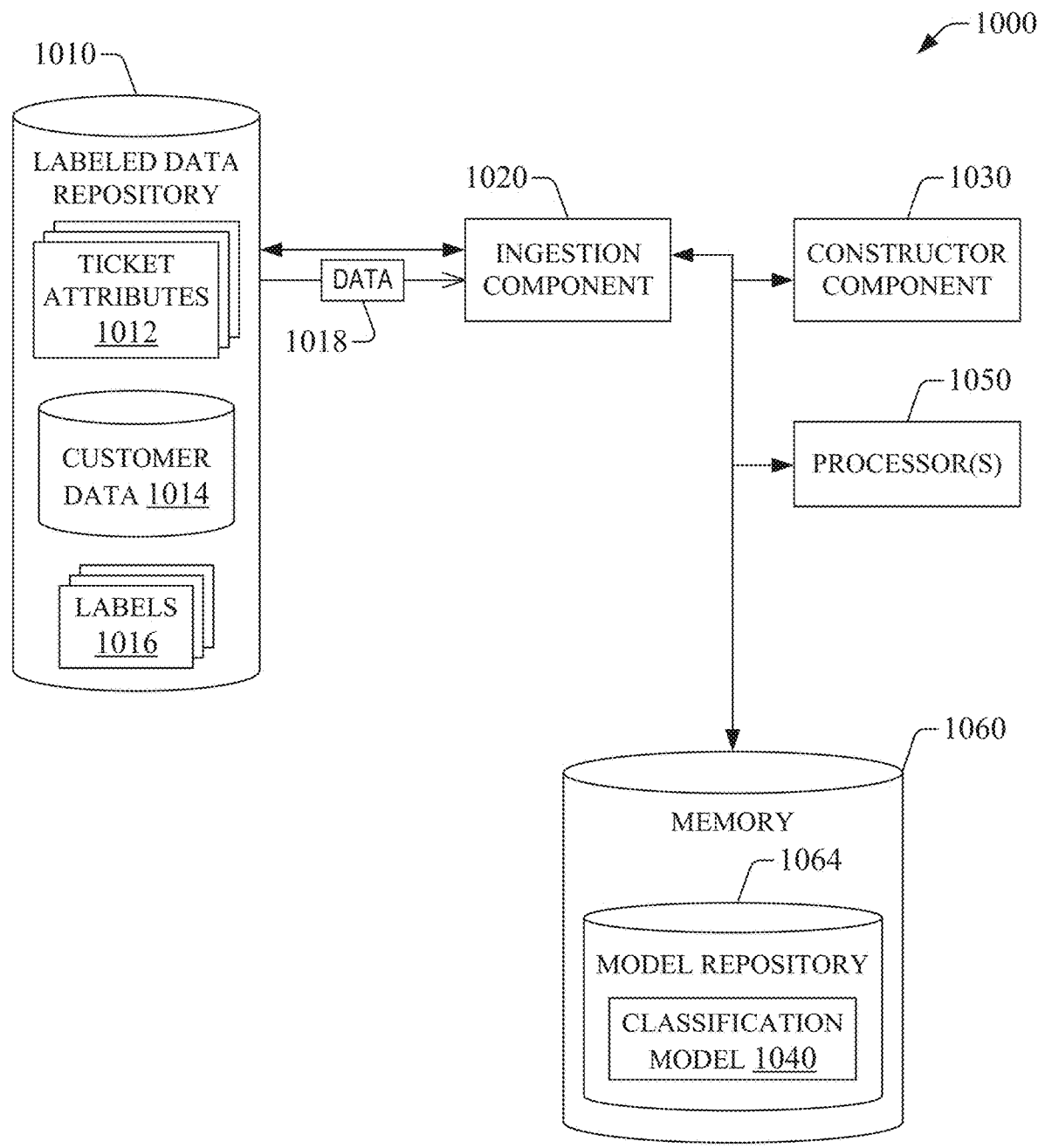
FIG. 10 illustrates a non-limiting example of a computing system for generation of a classification model to designate a ticket as pertaining to a particular difficulty category within multiple difficulty categories, in accordance with one or more embodiments described herein.

FIG. 10 illustrates a non-limiting example of a computing system 1000 for generation of a classification model (such as the classification model 114 (FIG. 1)) to designate a ticket as pertaining to a particular difficulty category from a group of multiple difficulty categories, in accordance with one or more embodiments described herein. As is illustrated, the computing system 1000 includes a labeled data repository 1010 that contains training data. The training data includes ticket attributes 1012 and also can include customer data 1014. As mentioned, ticket attributes can include, in some cases, market, geography, business division, ticket type, and sales stage. Values or instances of respective ticket attributes can indicate, individually or collectively, a complexity of a ticket. Customer data can include, in some cases, deal size or type of customer (e.g., returning customer or new customer), or both. The training data can be arranged according to tickets. Thus, in some cases, a first dataset of ticket attributes 1012 and a first dataset of customer data 1014 can correspond to a first ticket; a second dataset of ticket attributes 1012 and a second dataset of customer data 1014 can correspond to a second ticket; a third dataset of ticket attributes 1012 and a third dataset of customer data 1014 can correspond to a third ticket; and so forth.

The training data also can include target labels 1016, each one of the target labels 1016 corresponding to a respective ticket. A single label of the target labels 1016 can designate a corresponding to ticket as pertaining to particular difficulty category of the multiple difficulty categories. A label can be represented by Y and can be a cardinal categorical variable. For purposes of illustration, a cardinal categorical variable can adopt one of several values that are ordered and can be multiplied by a scalar. The magnitude of a difference between a first value and a second value of the several values is meaningful. For instance, the values can be integer numbers and can be ordered in increasing order, where a difference between those values can indicate a relative degree of complexity among a first value and a second value. The label is not limited to being a cardinal categorical variable and, in some embodiments, the label can be embodied in another type of variable.

A dataset identifying ticket attributes of a ticket and a dataset identifying customer data corresponding to the ticket can define a feature vector x for the ticket. In some embodiments, the classification model can be generated without reliance on customer data. In those embodiments, the dataset identifying ticket attributes can define x. Regardless of the manner of defining x, each component of x can represent a categorical variable. Simply as an illustration, in one embodiment, x can be a six-dimensional vector $(X_1, X_2, X_3, X_4, X_5, X_6)$ where $X_1$ represents market, $X_2$ represents ticket type, $X_3$ represents brand information, $X_4$ represents sales stage, $X_5$ represents deal size, and $X_6$ represents client type. Here, values of $X_1$, $X_2$, $X_3$, and $X_4$ can be defined by a dataset of ticket attributes 1012, and values of $X_5$ and $X_6$ can be defined by a dataset of customer data 1014.

The computing system 1000 includes an ingestion component 1020 that can obtain different types of training data to generate a classification model 1040 in accordance with aspects described herein. The ingestion component 610 can obtain labeled data 1018 from the labeled data repository 1010. The labeled data 1018 can include first data defining a feature vector $x_\tau$ for a ticket $\tau$ and second data defining a label $Y_\tau$ for the ticket, where the label designates the ticket as pertaining to a difficulty category from a group of multiple difficulty categories.

The computing system 1000 also includes a constructor component 1030 that can operate on the training data obtained by the ingestion component 1020. By operating on the training data, the constructor component 1030 can train a classification model 1040 using the data 1018 included in the training data. The classification model 1040 can be trained to classify a particular ticket as pertaining to one of a defined group of difficulty categories. In one example, the number of difficulty categories in that group can be five, represented by the following integer numbers: 1, 2, 3, 4, and 5, where 1 represents the least difficulty and 5 represents the greatest difficulty). To train the classification model, the constructor component 1030 can determine, using the data 1018, a solution to an optimization problem with respect to a prediction error function. Such a function yields a value based on evaluation of differences between known labels for respective tickets and predicted labels for the respective tickets, where the predicted labels are generated by applying a current iteration of the classification model 1040 to feature vectors of respective tickets. The solution to the optimization problem arises from converging to a set of model parameters that minimizes the prediction error function. The set of model parameters defines a trained classification model 1040. The constructor component 1030 can retain the trained classification model 1040 in the model repository 1064. In some embodiments, the model repository 1064 can embody, or can include, the model repository 264 (FIG. 2A).

Figure 11:
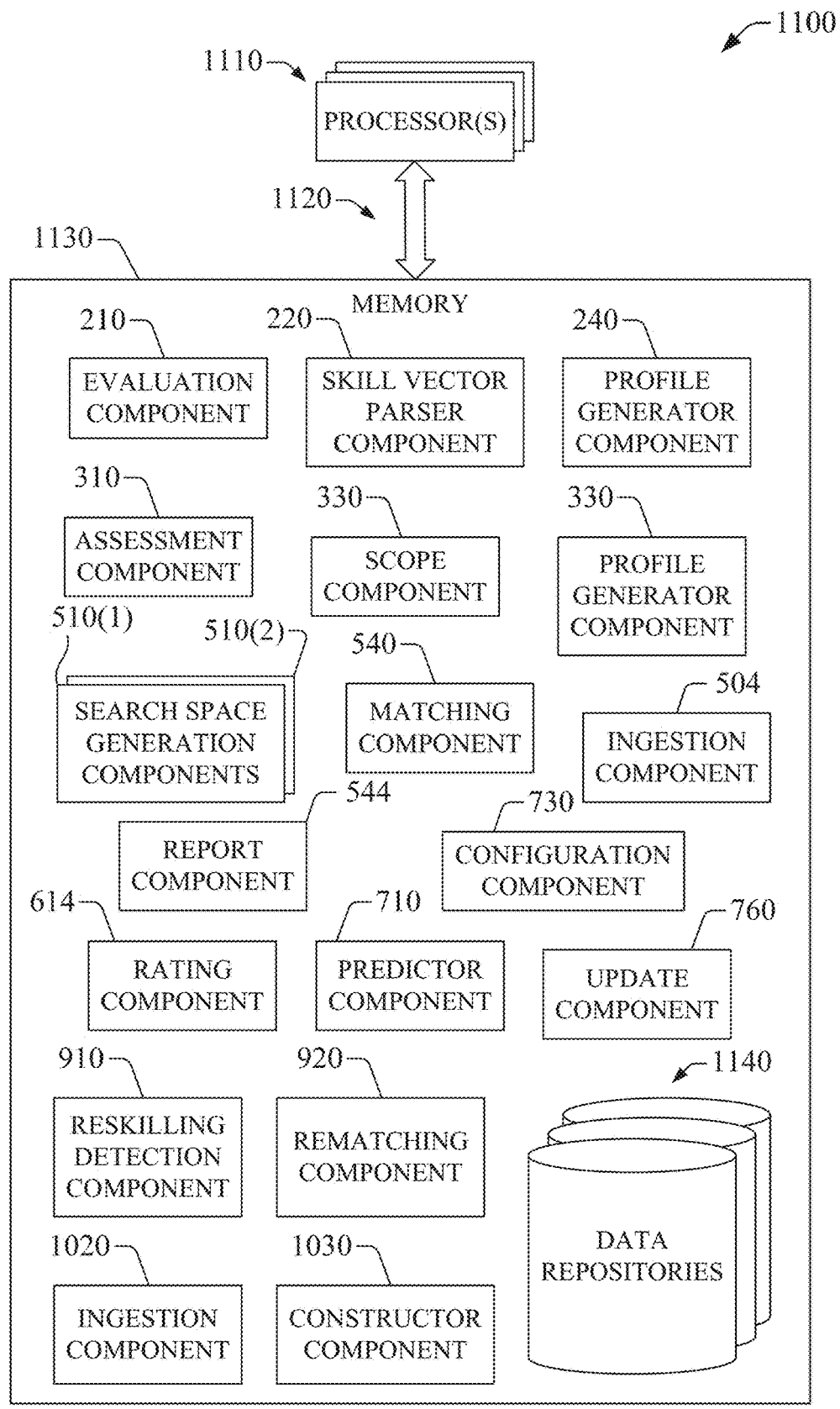
FIG. 11 illustrates a non-limiting example of another computing system for ticket-agent matching and agent skillset development, in accordance with one or more embodiments described herein.

FIG. 11 is a block diagram of a non-limiting example of computing system 1100 for ticket-agent matching and agent skillset development, in accordance with one or more embodiments described herein. As is illustrated in FIG. 11, the computing system 1100 can include one or many processors 1110 and one or many memory devices 1130 (referred to as memory 1130). In some embodiments, the processor(s) 1110 can be arranged in a single computing apparatus (a blade server device or another type of server device, for example). In other embodiments, the processor(s) 1110 can be distributed across two or more computing apparatuses (e.g., multiple blade server devices or other types of server devices). The one or many processors 1110 can be operatively coupled to the memory 1130 by one or many communication interfaces 1120, for example. The communication interface(s) 1120 can be suitable for the particular arrangement (localized or distributed) of the processor(s) 1110. In some embodiments, the communication interface(s) 1120 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

As is illustrated in FIG. 11, the memory 1130 can retain or otherwise store therein machine-accessible components (e.g., computer-readable and/or computer-executable components) in accordance with embodiments of this disclosure. As such, in some embodiments, machine-accessible instructions (e.g., computer-readable and/or computer-executable instructions) embody or otherwise constitute each one of the machine-accessible components within the memory 1130. The machine-accessible instructions are encoded in the memory 1130 and can be arranged to form each one of the machine-accessible components. The machine-accessible instructions can be built (e.g., linked and compiled) and retained in computer-executable form in the memory 1130 or in one or many other machine-accessible non-transitory storage media. Specifically, as is shown in FIG. 11, in some embodiments, the machine-accessible components include the evaluation component 210, the skill vector parser component 220, and the profile generator component 240. The machine-accessible components also can include the assessment component 310, the scope component 330, and the profile generator component 330. The machine-accessible components can further include the first search space generator component 510(1), the second search space generator component 510(2), the ingestion component 504, the matching component 540, and the report component 544. In addition, the machine-accessible components can include the rating component 614, the predictor component 710, the configuration component 730, and the update component 760. Further, the machine-accessible components can include the reskilling detection component 910, the rematching component 920, the ingestion component 1020, and the constructor component 1030.

As is also illustrated in FIG. 11, in some embodiments, the memory 1130 also can include several data repositories 1140. Those data repositories 1140 can include the skill data repository 230, model repository 264, the similarity data repository 520, the assignment data repository 530, the model repository 550, the ticket resolution data repository 720, and model repository 1064 and at least some of the data retained therein.

The machine-accessible components, individually or in a particular combination, can be accessed and executed by at least one of the processor(s) 1110. In response to execution, each one of the machine-accessible components can provide the functionality described herein. Accordingly, execution of the machine-accessible components retained in the memory 1130 can cause the computing system 1100 to operate in accordance with aspects described herein. More concretely, at least one of the processor(s) 1110 can execute the machine-accessible components to cause the computing system 1100 to permit the identification of program code as pertaining to a particular cost category from a group of cost categories and, in some cases, permit the generation of a recommendation for program code in another cost category, in accordance with aspects of this disclosure.

Although not illustrated in FIG. 11, the computing system 1100 also can include other types of computing resources that can permit or otherwise facilitate the execution of the machine-accessible components retained in the memory 1130. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 1130 also can include programming interface(s) (such as APIs); an operating system; software for configuration and or control of a virtualized environment; firmware; and the like.

Figure 12:
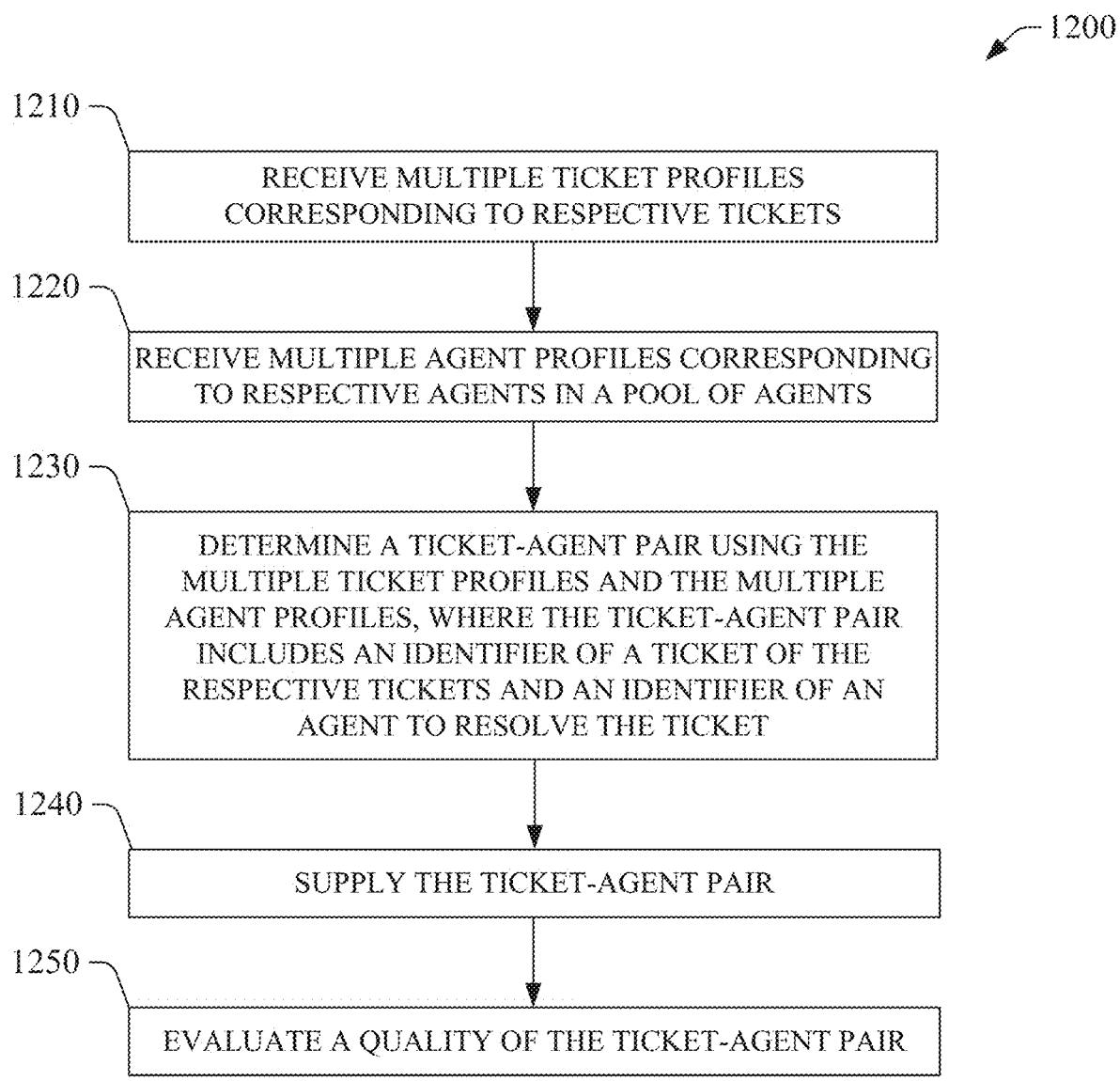
FIG. 12 illustrates a non-limiting example of a computer-implemented method for ticket-agent matching, in accordance with one or more embodiments described herein.

FIG. 12 is a flowchart of a non-limiting example of a computer-implemented method 1200 for ticket-agent matching, in accordance with one or more embodiments described herein. A computing system can implement, at least partially, the computer-implemented method 1200. Implementing the computer-implemented method 1200 can include compiling or executing, or both, one or several of the blocks included in the computer-implemented method 1200, for example. The computing system can include and/or can be operatively coupled to one or many processors, one or many memory devices, other types of computing resources (such as communication interface(s)), a combination thereof, or similar. In some embodiments, the computing system can be embodied in, or can constitute, the computing system 600 (FIG. 6) in accordance with the various embodiments disclosed herein.

At block 1210, the computing system can receive multiple ticket profiles corresponding to respective tickets. The computing system can receive the multiple ticket profiles via the ingestions component 504 (FIG. 5), for example. At block 1220, the computing system can receive multiple agent profiles corresponding to respective agents in a pool of agents. The computing system can receive the multiple agent profiles via the ingestions component 504 (FIG. 5), for example.

At block 1230, the computing system can determine a ticket-agent pair using the multiple ticket profiles and the multiple agent profiles. The ticket-agent pair includes an identifier of a ticket of the respective tickets and an identifier of an agent to resolve the ticket. To that end, the computing system can determine a solution to a matching problem with respect to the multiple ticket profiles and the multiple agent profiles. The solution can result in one or several ticket-agent pairs, including the ticket-agent pair. Accordingly, such a solution can identify the ticket-agent pair. The computing system can determine such a ticket-agent pair via the matching component 540 (FIG. 5), for example.

At block 1240, the computing system can supply the ticket-agent pair. The ticket-agent pair can be supplied via the report component 544, for example.

At block 1250, the computing system can evaluate a quality of the ticket-agent pair. The quality of the ticket-agent pair can be evaluated via the rating component 614 (FIG. 6), for example.

Figure 13:
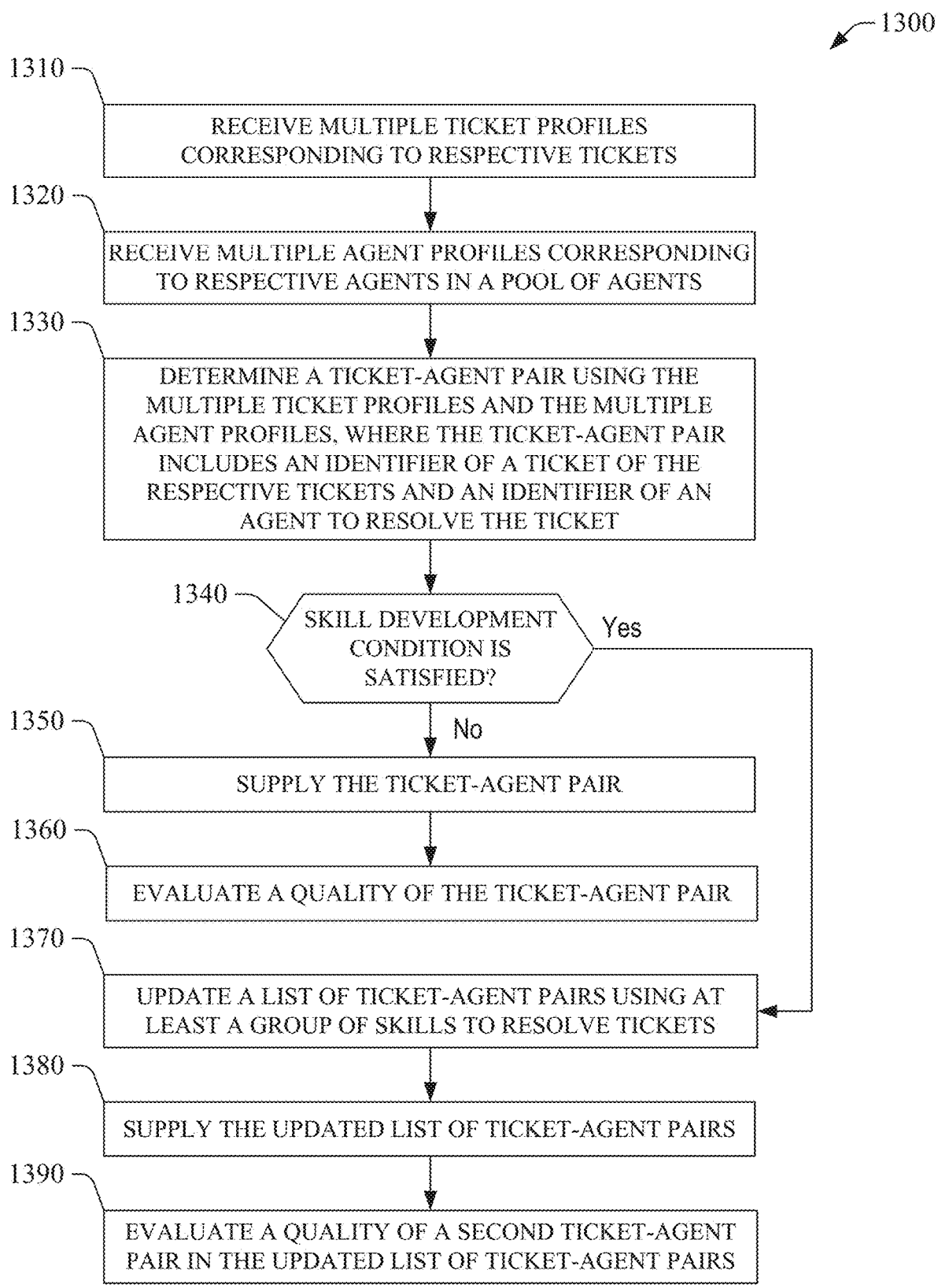
FIG. 13 illustrates a non-limiting example of a computer-implemented method for ticket-agent matching, in accordance with one or more embodiments described herein.

FIG. 13 illustrates a non-limiting example of a computer-implemented method for ticket-agent matching and developing of a skillset of an agent, in accordance with one or more embodiments described herein. A computing system can implement, at least partially, the computer-implemented method 1300. Implementing the computer-implemented method 1300 can include compiling or executing, or both, one or several of the blocks included in the computer-implemented method 1300, for example. The computing system can include and/or can be operatively coupled to one or many processors, one or many memory devices, other types of computing resources (such as communication interface(s)), a combination thereof, or similar. In some embodiments, the computing system can be embodied in, or can constitute, the computing system 600 (FIG. 6) in accordance with the various embodiments disclosed herein.

At block 1310, the computing system can receive multiple ticket profiles corresponding to respective tickets. The computing system can receive the multiple ticket profiles via the ingestions component 504 (FIG. 5), for example. At block 1320, the computing system can receive multiple agent profiles corresponding to respective agents in a pool of agents. The computing system can receive the multiple agent profiles via the ingestions component 504 (FIG. 5), for example.

At block 1330, the computing system can determine a ticket-agent pair using the multiple ticket profiles and the multiple agent profiles. The ticket-agent pair includes an identifier of a ticket of the respective tickets and an identifier of an agent to resolve the ticket. To that end, the computing system can determine a solution to a matching problem with respect to the multiple ticket profiles and the multiple agent profiles. The solution can result in one or several ticket-agent pairs, including the ticket-agent pair. Accordingly, such a solution can identify the ticket-agent pair. The computing system can determine such a ticket-agent pair via the matching component 540 (FIG. 5), for example.

At block 1340, the computing system can determine if a skill development condition is satisfied. The computing system can determine if such a condition is satisfied via the reskilling detection component 910 (FIG. 9A), for example. In response to a negative determination, the flow of the example method 1300 can continue to block 1350, where the computing system can supply the ticket-agent pair. At block 1360, the computing system can evaluate a quality of the ticket-agent pair. The quality of the ticket-agent pair can be evaluated via the rating component 614 (FIG. 6), for example.

In response to a positive determination at block 1340, the flow of the example method 1300 can continue to block 1370, where the computing system can update a list of ticket-agent pairs using at least a group of skills to resolve tickets. An example of the group of skills is illustrated in FIG. 4B. In some cases, the computing system can update the list of ticket-agent pairs via the rematching component 920 (FIG. 9A). Updating the list of ticket-agent pairs can include, in some embodiments, assigning a second identifier of a second agent within the pool of agents to the service request in order to develop a skillset of the second agent. The second agent identifier can be associated with an unsatisfactory skill score for a defined skill to resolve the service request.

At block 1380, the computing system can supply the updated list of ticket-agent pairs. The ticket-agent pair can be supplied via the report component 544, for example. At block 1390, the computing system can evaluate a quality of a second ticket-agent pair in the updated list of ticket-agent pairs. The quality of the ticket-agent pair can be evaluated via the rating component 614 (FIG. 6), for example.

Figure 14:
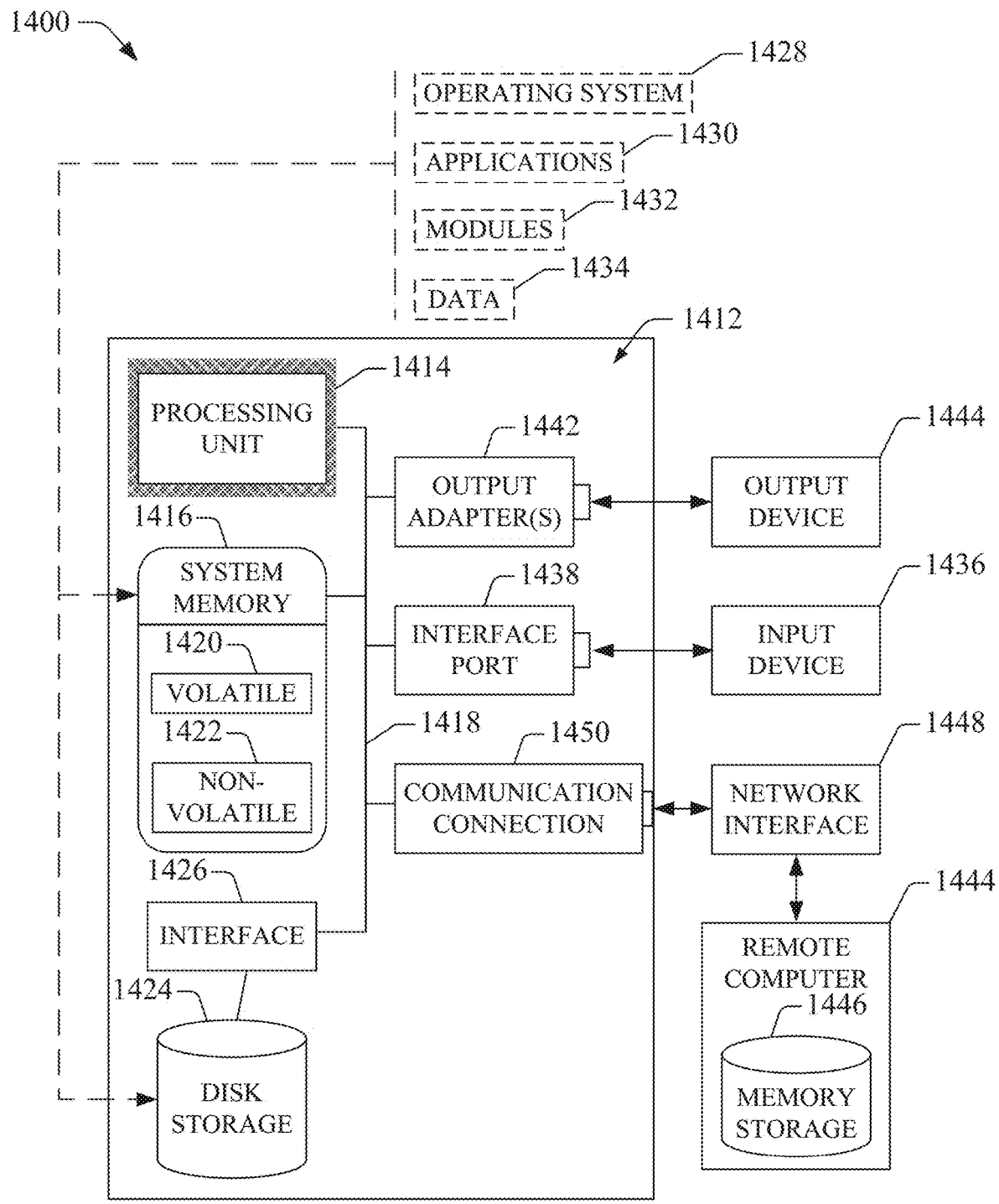
FIG. 14 is a block diagram of a non-limiting example of an operating environment in which one or more embodiments described herein can be implemented.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of a non-limiting example of an operating environment in which one or more embodiments described herein can be facilitated. Repetitive description of like elements employed in other embodiments described herein is omitted for sake of brevity. With reference to FIG. 14, a suitable operating environment 1400 for implementing various aspects of this disclosure can include a computer 1412. The computer 1412 can include a processing unit 1414, a system memory 1416, and a system bus 1418. The system bus 1418 can operably couple system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, can be stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface can be used, such as interface 1426. FIG. 14 also depicts software that can act as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 can take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through one or more input devices 1436. Input devices 1436 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 914 through the system bus 1418 via one or more interface ports 1438. The one or more Interface ports 1438 can include, for example, a serial port, a parallel port, a game port, and a universal serial bus (USB). One or more output devices 940 can use some of the same type of ports as input device 1436. Thus, for example, a USB port can be used to provide input to computer 1412, and to output information from computer 1412 to an output device 1440. Output adapter 1442 can be provided to illustrate that there are some output devices 1440 like monitors, speakers, and printers, among other output devices 1440, which require special adapters. The output adapters 1442 can include, by way of illustration and not limitation, video and sound cards that provide a means of connection between the output device 1440 and the system bus 1418. It should be noted that other devices and/or systems of devices provide both input and output capabilities such as one or more remote computers 1444.

Computer 1412 can operate in a networked environment using logical connections to one or more remote computers, such as remote computer 1444. The remote computer 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer 1444. Remote computer 1444 can be logically connected to computer 1412 through a network interface 1448 and then physically connected via communication connection 1450. Further, operation can be distributed across multiple (local and remote) systems. Network interface 1448 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Figure 15:
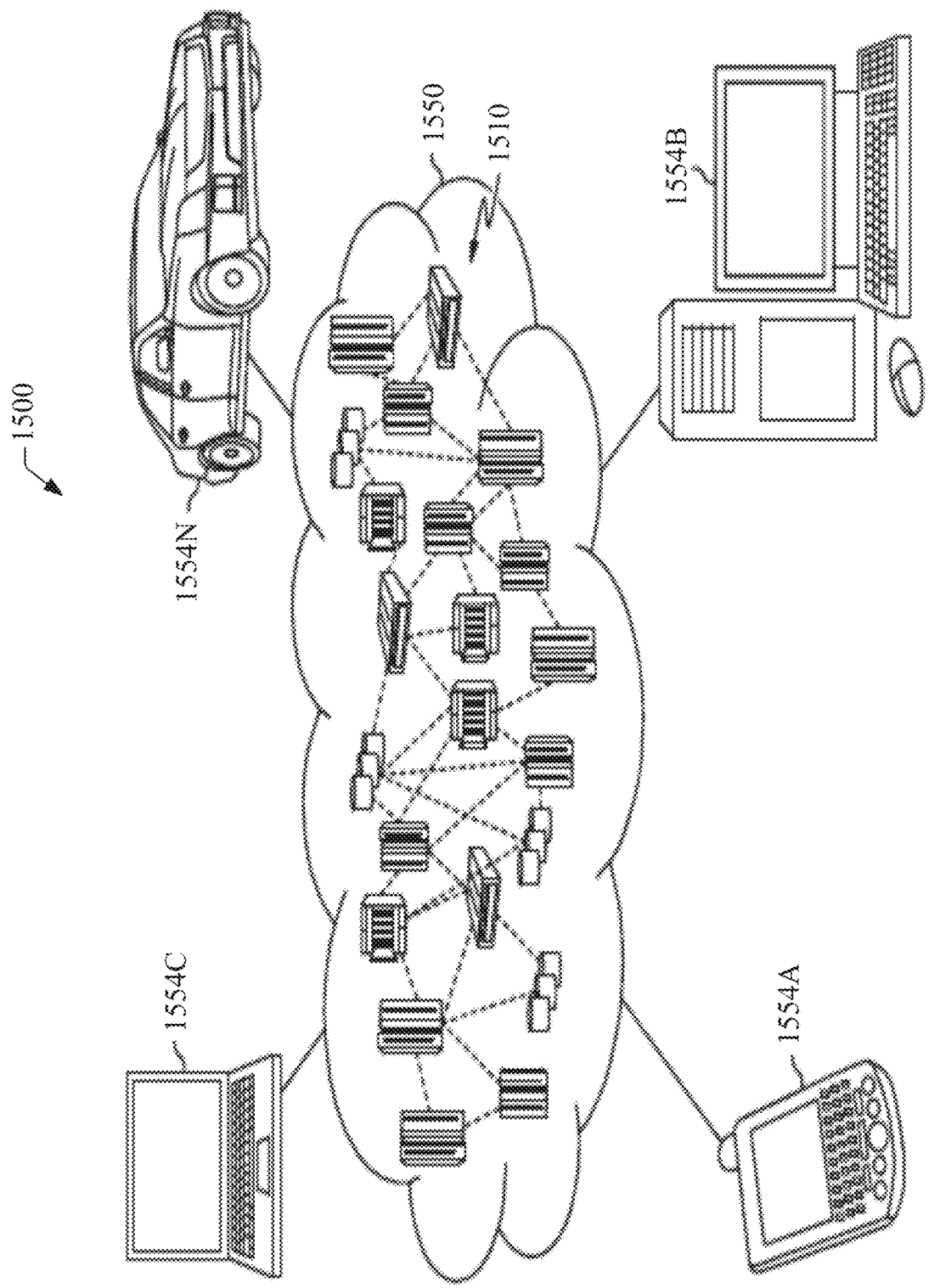
FIG. 15 is a block diagram of a non-limiting example of a cloud computing environment in accordance with one or more embodiments described herein.

In some cases, various embodiments of computing systems for ticket-agent matching and agent skillset development in accordance with aspects described herein can be associated with a cloud computing environment. Those computing systems can include one or several of computing system 100, computing system 600, or computing system 800. As an example, embodiments of the computing systems described herein can be associated with cloud computing environment 1550 as is illustrated in FIG. 15 and/or one or more functional abstraction layers described herein with reference to FIG. 16 (e.g., hardware and software layer 1660, virtualization layer 1670, management layer 1680, and/or workloads layer 1690).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 15 an illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Although not illustrated in FIG. 15, cloud computing nodes 1510 can further comprise a quantum platform (e.g., quantum computer, quantum hardware, quantum software, and/or another quantum platform) with which local computing devices used by cloud consumers can communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
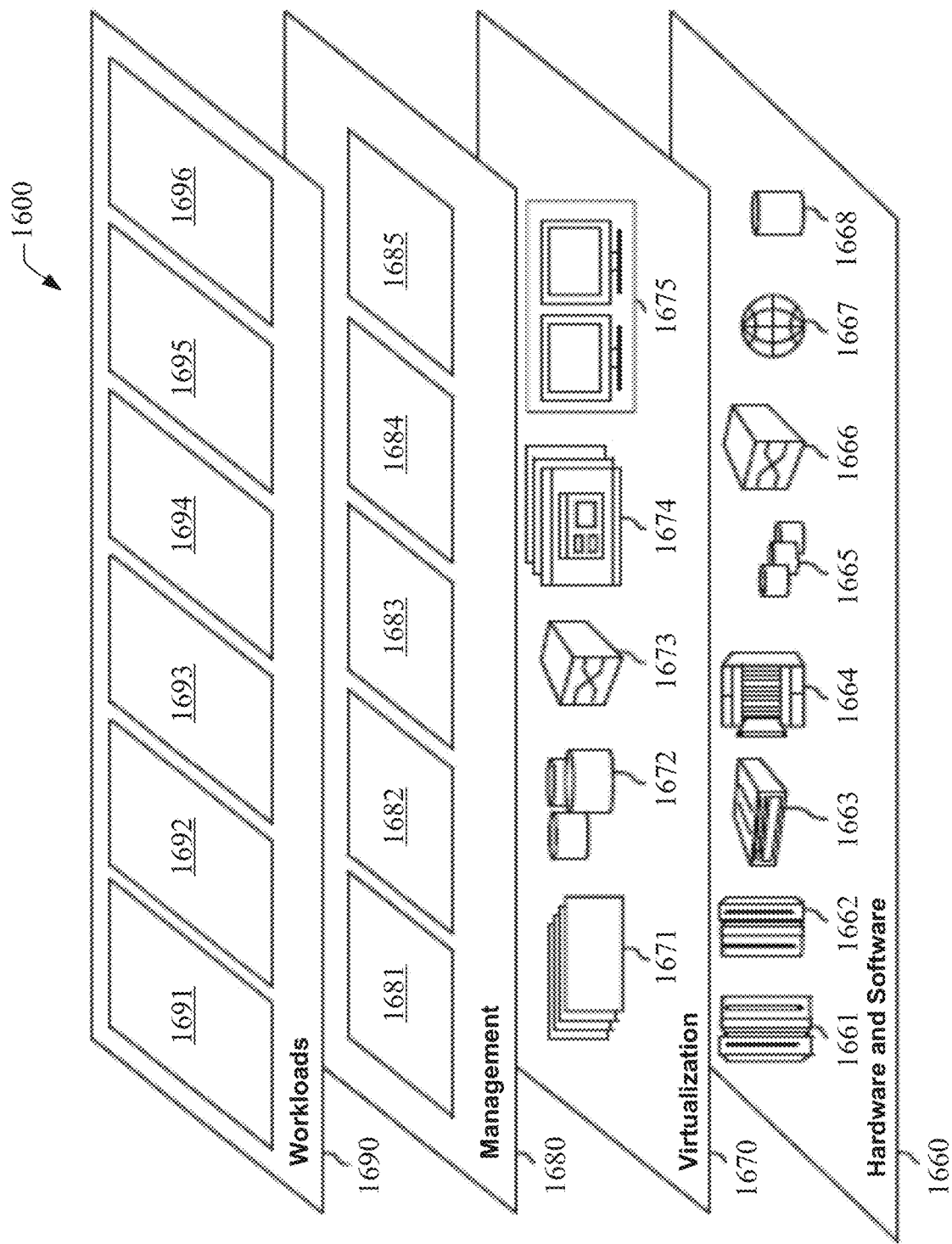
FIG. 16 is a block diagram of a non-limiting example of abstraction model layers in accordance with one or more embodiments described herein.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 include hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667, database software 1668, quantum platform routing software (not illustrated in FIG. 11), and/or quantum software (not illustrated in FIG. 16).

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Non-limiting examples of workloads and functions which may be provided from this layer include: mapping and navigation 1691; software development and lifecycle management 1692; virtual classroom education delivery 1693; data analytics processing 1694; transaction processing 1695; and vulnerability risk assessment software 1696.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," "data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a processor that executes computer-executable components stored in memory, the computer-executable components comprising:
    an assessment component that determines an agent profile for a first agent within a pool of agents based on a performance score for the first agent indicative of an efficacy of the first agent in resolving tickets, wherein the assessment component determines the performance score based on detection on of one or more keywords from text contained in unstructured data and application of a sentiment model to the one or more keywords;
    a matching component that determines, using a ticket profile and a space of agent profiles including the agent profile, a ticket-agent pair including a ticket identifier of a service request and an agent identifier for the first agent; and
    a rematching component that assigns a second agent identifier to the service request to develop a skillset of a second agent within the pool of agents, the second agent identifier being associated with an unsatisfactory skill score for a defined skill to resolve the service request.

2. The system of claim 1, further comprising:
  an ingestion component that receives the ticket profile, wherein the ticket profile represents a difficulty level and skillset for resolution of the service request; and
  a report component that sends the ticket-agent pair to a device, sending the ticket-agent pair causes the device to record an assignment of the agent identifier to the service request.

3. The system of claim 1, wherein the matching component determines a solution to a matching problem with respect to a space of ticket profiles and the space of agent profiles, wherein the space of ticket profiles includes the ticket profile, and wherein the solution results in the ticket-agent pair.

4. The system of claim 3, wherein the matching component determines the solution by solving an optimization problem with respect to a first optimization function and a second optimization function collectively, wherein the first optimization function is based on a number of assigned tickets in the pool of agents during a particular period and a number of tickets received during the particular period, and wherein the second optimization function includes a similarity function between a first ticket profile within the space of ticket profiles and a first agent profile within the space of agent profiles.

5. The system of claim 1, further comprising an evaluation component that determines a complexity attribute of the service request by applying a classification model to multiple features corresponding to the service request, wherein the complexity attribute designates the service request as pertaining to a particular difficulty category within a group of difficulty categories.

6. The system of claim 5, wherein the complexity attribute is a defined numeric parameter within an ordered set of numeric parameters, and wherein the system further comprises,
  a parser component that obtains a vector identifying at least one skill to be applied to resolve the service request; and
  a generator component that determines a product of the defined numeric parameter and the vector, the product defining the ticket profile.

7. The system of claim 6, wherein each coordinate of the vector corresponds to a particular skill and has one of a first value indicating that the particular skill is applicable to resolve the service request or a second value indicating that the particular skill is non-applicable to resolve the service request.

8. The system of claim 1, wherein the performance score comprises a first performance score, wherein the assessment component further determines an overall performance score for the first agent based on the first performance score and a second performance score for the first agent determined using structured data, and wherein the system further comprises;
    a scope component that determines a vector of skill scores for the agent identifier; and
    a generator component that determines a product of the overall performance score and the vector, the product defining a second agent profile of the space of agent profiles, the second agent profile corresponding to the agent identifier.

9. The system of claim 1, further comprising a rating component that determines a quality rating for the ticket-agent pair.

10. The system of claim 7, wherein the quality rating comprises a vector, and wherein the rating component determines a success metric defined as a function of both an actual completion time to resolve the service request by the particular agent and a predicted completion time to resolve the service request;
    updates a skill rating for a skill of the first agent by adding the success metric and an extant skill rating for the skill; and
    assigns the updated skill rating to a coordinate of the vector.

11. The system of claim 1, further comprising a detection component that activates a trigger signal to develop a skill, wherein the rematching component assigns the second agent identifier to the service request in response to the trigger signal being active, and wherein the unsatisfactory skill score is less than a threshold score.

12. The system of claim 11, wherein the defined skill is a sibling of a particular skill within a hierarchy of skills for resolution of the service request.

13. The system of claim 11, wherein the detection component activates the trigger signal by:
    determining an expected time to resolve a defined volume of service requests by the pool of agents during a future time interval;
    determining that the expected time is less than a threshold amount of time; and
    configuring the trigger signal to a particular value indicative of activation.

14. A computer-implemented method, comprising:
    determining, by a computing system operatively coupled to a processor, a performance score for a first agent within a pool of agents indicative of an efficacy of the first agent in resolving tickets, comprising:
        detecting, by the computing system, one or more keywords from text contained in unstructured data; and
        applying, by the computing system, a sentiment model to the one or more keywords to generate the performance score;
    determining, by the computing system, an agent profile for the first agent based on the performance score;
    determining, by the computing system, using a ticket profile and a space of agent profiles including the agent profile, a ticket-agent pair including a ticket identifier of a service request and an agent identifier for the first agent; and
    assigning, by the computing system, a second agent identifier to the service request to develop a skillset of a second particular agent within the pool of agents, wherein the second agent identifier is associated with an unsatisfactory skill score for a defined skill to resolve the service request.

15. The computer-implemented method of claim 14, wherein the ticket profile represents a difficulty level and skillset for resolution of the service request, and the method further comprising sending, by the computing system, the ticket-agent pair to a device, the sending the ticket-agent pair causes the device to record an assignment of the agent identifier to the service request.

16. The computer-implemented method of claim 14, further comprising determining, by the computing system, a complexity attribute of the service request by applying a classification model to multiple features corresponding to the service request, wherein the complexity attribute designates the service request as pertaining to a particular difficulty category within a group of difficulty categories.

17. The computer-implemented method of claim 16, wherein the complexity attribute is a defined numeric parameter within an ordered set of numeric parameters, and wherein the computer-implemented method further comprises:
    obtaining, by the computing system, a vector identifying at least one skill to be applied to resolve the service request; and
    determining a product of the defined numeric parameter and the vector, the product defining the ticket profile.

18. The computer-implemented method of claim 14, wherein the performance score comprises a first performance score, and the method further comprising:
    determining, by the computing system, using structured data a second performance score for the agent identifier;
    determining, by the system, an overall performance score for the agent identifier based on a product of the first performance score and the second performance score;
    determining, by the computing system, a vector of skill scores for the agent identifier; and
    determining, by the computing system, a product of the overall performance score and the vector, the product defining a second agent profile of the space of agent profiles, the second agent profile corresponding to the agent identifier.

19. A computer program product that matches ticket identifiers to agent identifiers, the computer program product comprising a computer-readable storage medium having program instructions embodied therewith, the program instructions executable by a processor to cause the processor to:
    detect, by the processor, one or one or more keywords from text contained in unstructured data;
    apply, by the processor, a sentiment model to the one or more keywords to generate a performance score for a particular agent within a pool of agents indicative of an efficacy of the particular agent in resolving tickets;
    determine, by the processor, an agent profile for the particular agent based on the performance score;
    determine, by the processor, using a ticket profile and a space of agent profiles including the agent profile, a ticket-agent pair including a ticket identifier of a service request and an agent identifier of a particular agent within a pool of agents; and
    assign, by the processor, a second agent identifier to the service request to develop a skillset of a second particular agent within the pool of agents, wherein the second agent identifier is associated with an unsatisfactory skill score for a defined skill to resolve the service request.

20. The computer program product of claim 19, wherein the ticket profile represents a difficulty level and skillset for resolution of the service request, and wherein the computer-executable instructions are further executable to cause the processor to:
    send, by the processor, the ticket-agent pair to a device, sending the ticket-agent pair causes the device to record an assignment of the agent identifier to the service request.

\* \* \* \* \*